United States Patent
Henry et al.

(10) Patent No.: US 8,615,672 B2
(45) Date of Patent: Dec. 24, 2013

(54) MULTICORE PROCESSOR POWER CREDIT MANAGEMENT TO ALLOW ALL PROCESSING CORES TO OPERATE AT ELEVATED FREQUENCY

(75) Inventors: G. Glenn Henry, Austin, TX (US);
Darius D. Gaskins, Austin, TX (US);
Stephan Gaskins, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 363 days.

(21) Appl. No.: 13/157,555

(22) Filed: Jun. 10, 2011

(65) Prior Publication Data
US 2012/0047385 A1    Feb. 23, 2012

Related U.S. Application Data

(60) Provisional application No. 61/360,005, filed on Jun. 30, 2010.

(51) Int. Cl.
*G06F 1/00* (2006.01)
*G06F 11/30* (2006.01)

(52) U.S. Cl.
USPC ........... 713/340; 713/300; 713/310; 713/320; 713/322; 713/323; 713/330

(58) Field of Classification Search
USPC .......... 713/300, 310, 320, 322, 323, 330, 340
See application file for complete search history.

(56) References Cited

U.S. PATENT DOCUMENTS

| | | |
|---|---|---|
| 4,569,589 A | 2/1986 | Neufeld |
| 4,591,841 A | 5/1986 | Gunderson et al. |
| 4,615,014 A | 9/1986 | Gigandet et al. |
| 6,367,023 B2 | 4/2002 | Kling et al. |
| 6,651,176 B1 | 11/2003 | Soltis, Jr. et al. |
| 6,802,015 B2 | 10/2004 | Atkinson |
| 6,813,719 B2 | 11/2004 | Athas |
| 6,966,008 B2 | 11/2005 | Athas |
| 7,171,570 B2 | 1/2007 | Cox et al. |

(Continued)

OTHER PUBLICATIONS

Subramanian et al. "Conjoined Pipeline: Enhancing Hardware Reliability and Performance through Organized Pipeline Redundancy." 2008 14th IEEE Pacific Rim International Symposium on Dependable Computing. pp. 9-16.

(Continued)

*Primary Examiner* — Kim Huynh
*Assistant Examiner* — Zahid Choudhury
(74) *Attorney, Agent, or Firm* — E. Alan Davis; James W. Huffman

(57) ABSTRACT

A microprocessor includes two or more processing cores each configured to determine, at each of succeeding instances in time, an amount of energy consumed by the microprocessor during a period preceding the instance in time. The period is predetermined. Each core also operates at a frequency above a predetermined frequency in response to determining the amount of energy consumed is less than a predetermined amount of energy. All of the cores may operate above the predetermined frequency simultaneously until one of the cores determines the microprocessor has consumed more than the predetermined amount of energy during the period preceding the instance in time. The predetermined frequency may be: a frequency at which all the cores can operate over the predetermined period without the microprocessor consuming more than the predetermined amount of energy, or alternatively the maximum frequency at which system software may request the cores to operate.

36 Claims, 15 Drawing Sheets

(56) References Cited

U.S. PATENT DOCUMENTS

| | | | |
|---|---|---|---|
| 7,178,043 | B2 | 2/2007 | Nakazato |
| 7,315,626 | B2 | 1/2008 | Pedersen |
| 7,340,622 | B2 | 3/2008 | Cox et al. |
| 7,360,101 | B2 | 4/2008 | Kang |
| 7,451,333 | B2 | 11/2008 | Naveh et al. |
| 7,562,234 | B2 | 7/2009 | Conroy et al. |
| 7,689,846 | B1 | 3/2010 | Athas |
| 7,818,596 | B2 | 10/2010 | Fenger et al. |
| 8,010,824 | B2 | 8/2011 | Naffziger |
| 2003/0188210 | A1 | 10/2003 | Nakazato |
| 2007/0050646 | A1 | 3/2007 | Conroy et al. |
| 2007/0260897 | A1 | 11/2007 | Cochran et al. |
| 2009/0119523 | A1 | 5/2009 | Totten |
| 2010/0049997 | A1 | 2/2010 | Tu |
| 2010/0229012 | A1 | 9/2010 | Gaskins et al. |
| 2011/0022868 | A1 | 1/2011 | Harchol-Balter et al. |
| 2011/0314305 | A1* | 12/2011 | de Cesare et al. ............. 713/300 |

OTHER PUBLICATIONS

Maekinen, Sami "CPU & GPU Overclocking Guide." ATI Technologies, Inc. 2006 pp. 1-26.

ASRock New Product Release. "Get the Most Out of Your ASRock H55 Motherboards: Turbo 50-50% Performance Boost Up." Jan. 29, 2010 pp. 1-3.

Semin, Andrey "Inside Intel Nehalem Microarchitecture." Slideshow. The Eighth Annual Meeting on High Performance Computing and Infrastructure in Norway. May 18-20, 2009. pp. 1-46.

Rubio et al. "Dynamic Processor Overclocking for Improving Performance of Power-Constrainted Systems." IBM Research Report. Jul. 14, 2005. pp. 1-20.

Sasikala, D. et al. "Processor Performance Enhancement Using Self-Adaptive Clock Frequency." International Journal of Computer Applications. vol. 3. No. 11 Jul. 2010. pp. 19-26.

Intel Corporation. "Intel® Turbo Boost Technology in Intel® Core™ Microarchitecture (Nehalem) Based Processors." White Paper. Nov. 2008. pp. 1-12.

Ung, Gordon Mah. "Everything You Need to Know About Nehalem 'Turbo Mode'" Published on Maximum PC (http://www.maximumpc.com), Aug. 22, 2008; download Jun. 10, 2010 from http://www.maximumpc.com/article/features/everything_you_need_know_about_nehalems_turbo_mode. pp. 1-2.

Liu, Yongpan et al. "Accurate Temperature-Dependent Integrated Circuit Leakage Power Estimation is Easy." Proceedings of the Conference on Design, Automation and Test in Europe (Nice, France, Apr. 16-20, 2007). Design, Automation, and Test in Europe. EDA Consortium, San Jose, CA pp. 1526-1531.

Isci, Canturk et al. "An Analysis of Efficient Multi-Core Global Power Management Policies: Maximizing Performance for a Given Power Budget." Proc. Intl (Symp. Microarch.) (MICRO) 2006, pp. 347-358.

Su, Haihua et al. "Full Chip Leakage Estimation Considering Power Supply and Temperature Variations." ISLPED '03, Aug. 25-27, 2003, Seoul, Korea. pp. 78-83.

Naveh, Alon et al. "Power and Thermal Management in the Intel® Core™ Duo Processor." Intel Technology Journal, vol. 10, Issue 2, May 15, 2006. pp. 109-122.

* cited by examiner

MULTICORE PROCESSOR POWER CREDIT MANAGEMENT TO ALLOW ALL PROCESSING CORES TO OPERATE AT ELEVATED FREQUENCY

CROSS REFERENCE TO RELATED APPLICATION(S)

This application claims priority based on U.S. Provisional Application Ser. No. 61/360,005, filed Jun. 30, 2010, entitled DUAL CORE PROCESSOR POWER CREDIT MANAGEMENT, which is hereby incorporated by reference in its entirety.

This application is related to the following co-pending U.S. patent applications which are concurrently filed herewith, each of which is incorporated by reference herein for all purposes.

| Ser. No. | Title |
| --- | --- |
| 13/157,436 | MULTICORE PROCESSOR POWER CREDIT MANAGEMENT IN WHICH MULTIPLE PROCESSING CORES USE SHARED MEMORY TO COMMUNICATE INDIVIDUAL ENERGY CONSUMPTION |
| 13/157,498 | MULTICORE PROCESSOR POWER CREDIT MANAGEMENT BY DIRECTLY MEASURING PROCESSOR ENERGY CONSUMPTION |

FIELD OF THE INVENTION

The present invention relates in general to the field of microprocessor power management, particularly in a multi-core microprocessor.

BACKGROUND OF THE INVENTION

U.S. patent application Ser. No. 12/403,195, filed Mar. 12, 2009, which is hereby incorporated by reference in its entirety, discloses an adaptive power throttling feature that attempts to provide the user the most performance possible while still staying below a maximum power consumption (P) over a defined time interval (T). The P and T values are typically specified by the manufacturer of the system that incorporates the microprocessor that includes the adaptive power throttling feature. The microprocessor knows the frequency at which it can operate indefinitely without consuming more than P Watts and typically operates at this frequency (Xp). (In one embodiment, the frequency at the operating point Xp corresponds to the well-known P-state commonly referred to as P0.) However, at numerous sub-intervals of T (referred to as bins), the microprocessor calculates the average power consumed (A) over the most recent T time and compares A with P. If A is sufficiently less than P (i.e., the microprocessor has power "credits"), the microprocessor may decide to run itself at a frequency that is higher than Xp.

The introduction of dual cores on a single microprocessor package introduces complexity to the adaptive power throttling feature, or power credit feature. This is because the system manufacturer imposes the P and T requirement on a microprocessor package basis, not on a per-core basis. However, the independent cores will likely consume different power over a given T. First, the operating system changes the operating points (e.g., P-states and C-states) independently for each core such that the cores consume different power. Furthermore, the software workload will likely be different on the two cores. Additionally, the independent cores may reach their bin intervals at different points in real time. Nevertheless, the P and T requirements must be met for the microprocessor package as a whole.

BRIEF SUMMARY OF INVENTION

In one aspect the present invention provides a microprocessor. The microprocessor includes two or more processing cores. Each processing core is configured to determine, at each of succeeding instances in time, an amount of energy consumed by the microprocessor during a period preceding the instance in time. The period is a predetermined length of time. Each processing core is also configured to operate the processing core at a frequency above a predetermined frequency in response to determining that the amount of energy consumed by the microprocessor during the period preceding the instance in time is less than a predetermined amount of energy. The microprocessor is configured such that all of the two or more processing cores may operate above the predetermined frequency simultaneously until one of the two or more processing cores determines that the microprocessor has consumed more than the predetermined amount of energy during the period preceding the instance in time.

In another aspect, the present invention provides a method for operating a microprocessor. The method includes determining, by each of two or more processing cores, at each of succeeding instances in time, an amount of energy consumed by the microprocessor during a period preceding the instance in time. The period is a predetermined length of time. The method also includes operating, by each of the two or more processing cores, the processing core at a frequency above a predetermined frequency in response to determining that the amount of energy consumed by the microprocessor during the period preceding the instance in time is less than a predetermined amount of energy. Thereafter all of the two or more processing cores operate above the predetermined frequency simultaneously until one of the two or more processing cores determines that the microprocessor has consumed more than the predetermined amount of energy during the period preceding the instance in time.

In yet another aspect, the present invention provides a computer program product encoded in at least one computer readable storage medium for use with a computing device, the computer program product including computer readable program code embodied in said medium for specifying a microprocessor. The computer readable program code includes program code for specifying two or more processing cores. Each processing core is configured to determine, at each of succeeding instances in time, an amount of energy consumed by the microprocessor during a period preceding the instance in time. The period is a predetermined length of time. Each processing core is also configured to operate the processing core at a frequency above a predetermined frequency in response to determining that the amount of energy consumed by the microprocessor during the period preceding the instance in time is less than a predetermined amount of energy. The microprocessor is configured such that all of the two or more processing cores may operate above the predetermined frequency simultaneously until one of the two or more processing cores determines that the microprocessor has consumed more than the predetermined amount of energy during the period preceding the instance in time.

DETAILED DESCRIPTION OF THE INVENTION

Embodiments for performing a power credit feature on a multi-core package are described. According to one embodiment, the cores share power information so that one of them, in a given instant, can perform the power credit calculation for the entire package. When one core determines that the necessary package-wide power credits are not available, the core changes to a lower power P-state in order to ensure the package-wide P and T requirements are satisfied. More specifically, the core operates at Xp or below in order to ensure the package-wide P and T requirements are satisfied, where Xp is the frequency at which all cores of the microprocessor can operate over the interval T without the microprocessor consuming more than an amount of energy that is approximately the product of P Watts and T seconds, and Xp may be the highest frequency at which system software may request the core to operate, which in some systems is commonly referred to as P-state P0.

In one embodiment, the two cores share power credit information through memory. In one embodiment, a region in the SMM memory space is used. The BIOS writes the base address of the region into an MSR of each core. Each time one core experiences an event in a predetermined list (frequency/voltage change, enter/exit sleep state, timer tick to update average core power, etc.), it posts the new power credit information to the shared memory area.

Figure 1:
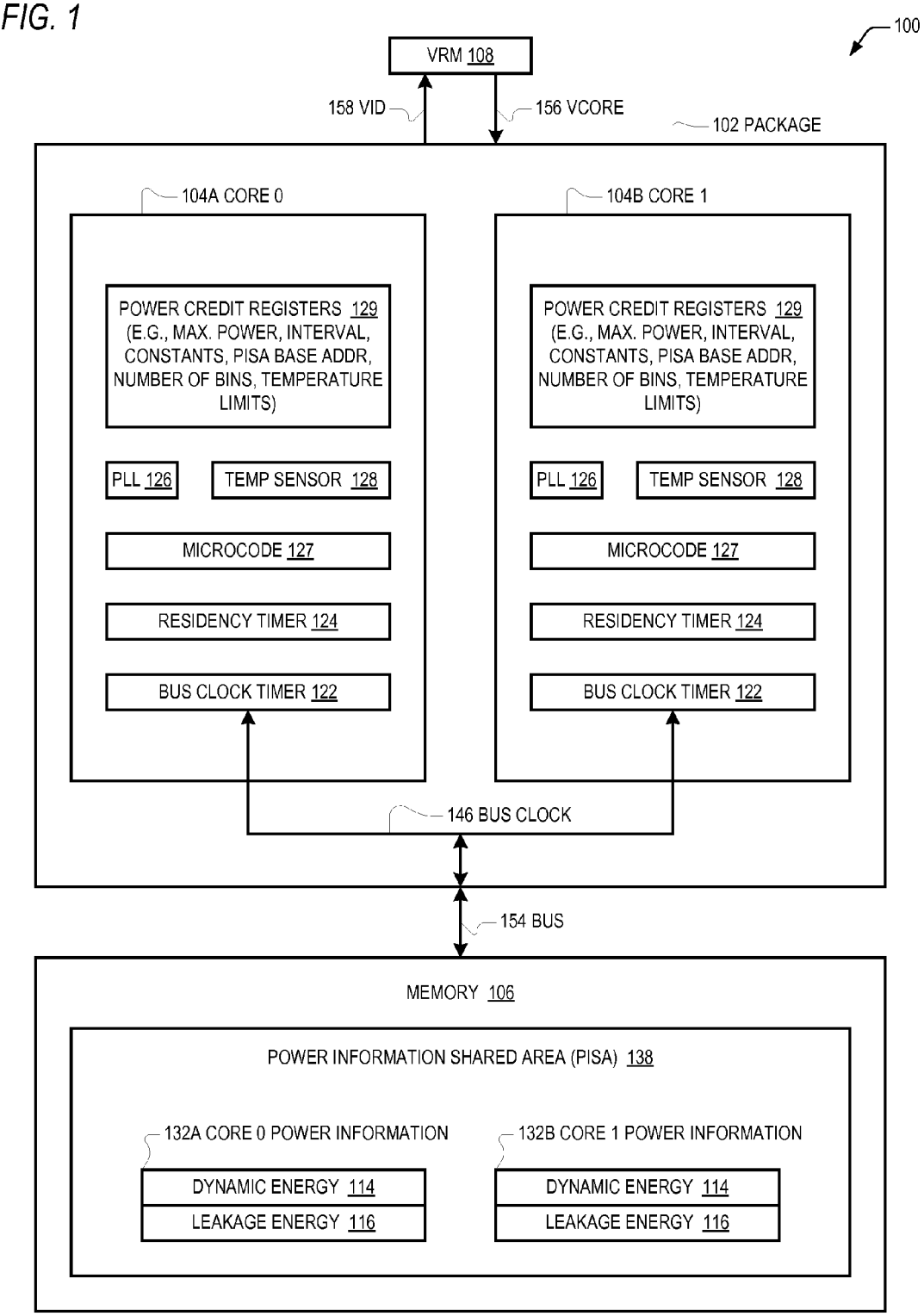
FIG. 1 is a block diagram illustrating a computing system including a dual-core microprocessor package that includes a power credit feature according to the present invention.

Referring now to FIG. 1, a block diagram illustrating a computing system 100 including a dual-core microprocessor package 102 that includes a power credit feature according to the present invention is shown. The package 102 includes two cores: core 0 104A and core 1 104B. Although FIG. 1 illustrates an embodiment with two cores 104, the multi-core power credit features described herein may be employed in embodiments with more than two cores 104.

In addition to the dual-core microprocessor package 102, the system 100 includes a voltage regulator module (VRM) 108 coupled to the package 102. The VRM 108 provides power to the package 102 by a VCORE signal 156. The package 102 provides a VID signal 158 to the VRM 108 to control the voltage level the VRM 108 provides on the VCORE signal 156 to the package 102.

The system 100 also includes a memory 106 coupled to the package 102 by the processor bus 154. Typically, a memory controller (not shown), such as a North Bridge of a chipset, is interposed between the memory 106 and the bus 154. A region of the memory 106 is allocated by system software, such as BIOS or the operating system, as a power information shared area (PISA) 138. The PISA 138 includes power information 132A for core 0 104A shared to core 1 104B, and power information 132B for core 1 104B shared to core 0 104A. Each core's 104 power information 132 includes a dynamic energy 114 value that represents a computed amount of dynamic energy consumed by the respective core 104 during the most recent interval (T), and a leakage energy 116 value that represents a computed amount of leakage energy consumed by the respective core 104 during the most recent interval (T). In one embodiment, each core's 104 power information 132 also includes a dynamic power constant used to calculate the dynamic power of the respective core 104, as described below. Advantageously, the PISA 138 provides a means for the two cores 104 to communicate power information to one another in order to implement the power credit feature in a multi-core fashion, as described in more detail below, without requiring communication of the power information via signal wires between the two cores 104.

Each core 104 includes a phase-locked loop (PLL) 126 that provides the core clock signals to the core 104 circuits. Each core 104 also includes a temperature sensor 128 that senses the core 104 temperature. In one embodiment, the core 104 temperature may be read from the temperature sensor 128 by microcode 127 of the core 104.

Each core 104 also includes a bus clock timer 122. The bus clock timer 122 is coupled to receive a bus clock signal 146 that is provided from a processor bus 154 coupled to the package 102. The bus clock timer 122 increments while the bus clock 146 and the core 104 clocks to the bus clock timer 122 are active to enable the bus clock timer 122 to keep track of time while the core 104 is in this state. The bus clock timer 122 increments at the rate of the bus clock signal 146. In this manner, the bus clock 146 provides a common source by which each core 104 can keep track of time via its bus clock timer 122. In particular, each core 104 programs the bus clock timer 122 to provide a periodic interrupt to the core 104 for power credit purposes. More specifically, the interval (T) (e.g., one second) is divided into equal length bins (e.g., 128 bins), and the core 104 programs the bus clock timer 122 to interrupt each bin interval, or bin time, or bin length. In one embodiment, the processor bus 154 includes the well-known STPCLK and SLP signals of the Pentium® processor bus. In one embodiment, the bus clock timer 122 ceases to run after SLP is asserted.

Each core 104 also includes a residency timer 124. The residency timer 124 increments even when the core 104 clocks are not active to enable the residency timer 124 to keep track of time while the core is in this state. In one embodiment, the residency timer 124 is driven by a free running oscillator such that the residency timer 124 increments even when the core clocks are stopped. In one embodiment, because the frequency of the free running oscillator may vary between the two cores 104, each core 104 calibrates its residency timer 124 to the bus clock 146 frequency at initialization time.

Each core 104 also includes registers 129 for holding information used by each core 104 to perform the power credit feature as described herein. The power credit information includes information such as the maximum power consumption (P) value; the time interval (T) value; various constants associated with the power calculations, such as the dynamic power constant of the core 104, which may be determined during manufacture of the package 102; the base address of the PISA 138; the number of bins; the temperature limits over which the cores 104 may not take advantage of power credits it has built up; and dynamic power factors used to calculate the dynamic energy consumed, discussed below. Some of the power credit values may be programmed into the registers 129 by system software, and some of the power credit values may be programmed into the registers 129 during manufacturing, such as via fuses and/or hardwired values. Some of the registers 129 may be model specific registers (MSRs) of the cores 104.

Figure 2:
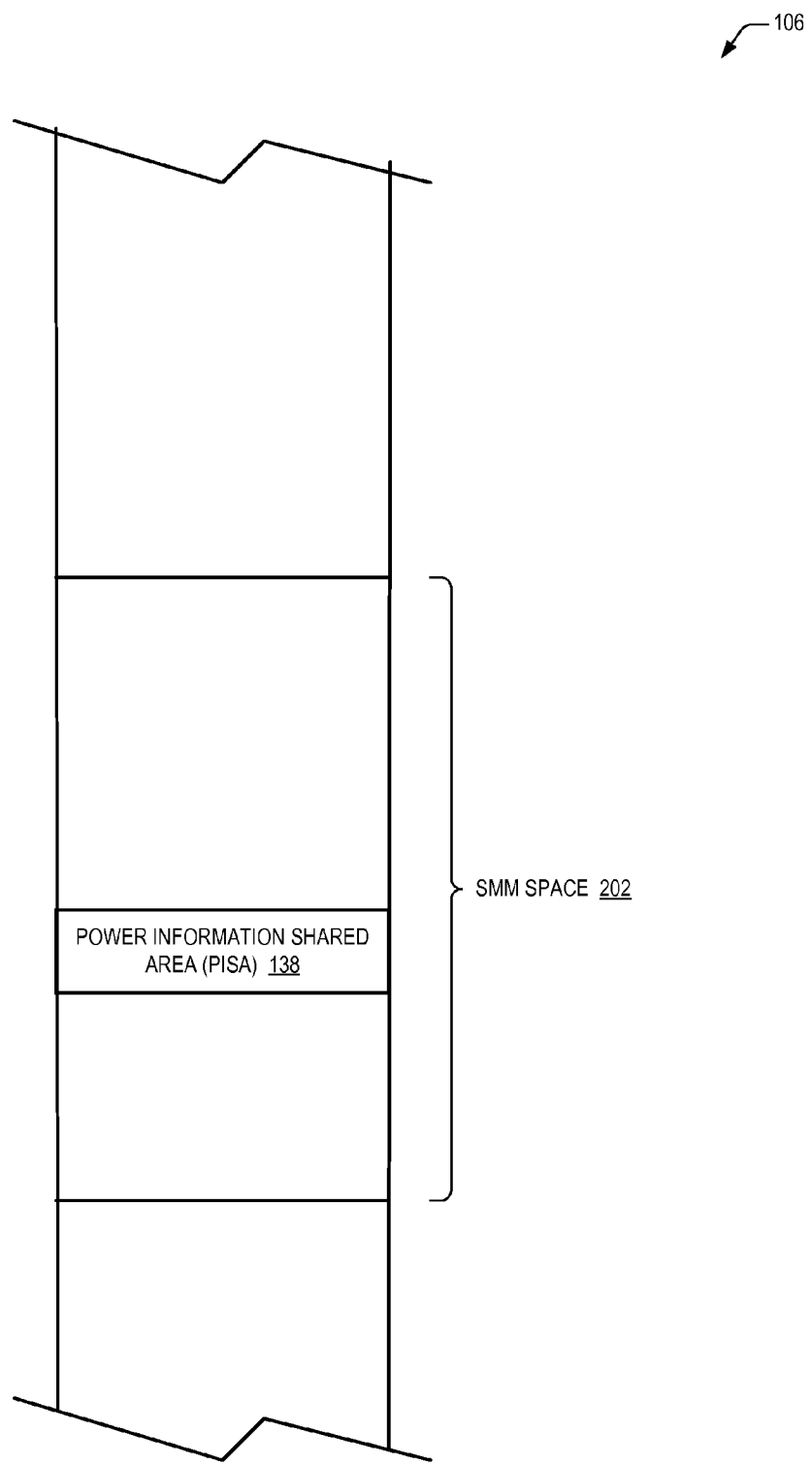
FIG. 2 is a block diagram illustrating the location of the PISA within the memory of the system of FIG. 1.

Referring now to FIG. 2, a block diagram illustrating the location of the PISA 138 within the memory 106 of the system 100 of FIG. 1 is shown. According to one embodiment, the cores 104 are x86 architecture cores that support the well-known system management mode (SMM). A processor is an x86 architecture processor if it can correctly execute a majority of the application programs that are designed to be executed on an x86 processor. An application program is correctly executed if its expected results are obtained. In particular, the cores 104 execute instructions of the x86 instruction set and include the x86 user-visible register set. As shown in FIG. 2, according to one embodiment, the system software (e.g., operating system, BIOS) allocates for the PISA 138 a portion of the SMM memory space that is unused by other functions that use the SMM memory space. Accordingly, the system software programs the power credit registers 129 with the base address of the PISA 138. In other embodiments, the system software allocates for the PISA 138 a portion of the memory 106 space that is unused by the system software and programs the power credit registers 129 with the base address of the PISA 138.

Figure 3:
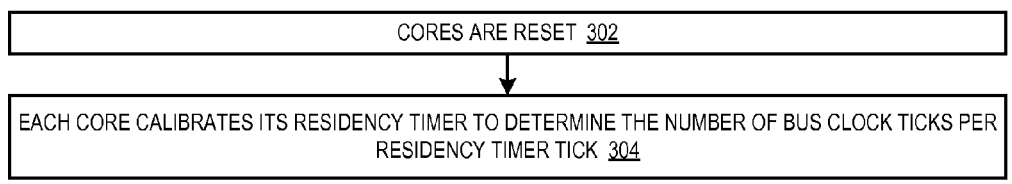
FIGS. 3-10 are flowcharts illustrating operation of the system of FIG. 1 according to the present invention.

Referring now to FIG. 3, a flowchart illustrating operation of the package 102 of FIG. 1 according to the present invention is shown. Flow begins at block 302.

At block 302, the cores 104 are reset. The cores 104 may be reset, for example, by a power-on reset, assertion of a reset pin of the package 102, or a software reset. Flow proceeds to block 304.

At block 304, each of the cores 104 calibrates its residency timer 124. That is, each core 104 determines the cycle period of the residency timer 124. As mentioned above, the residency timer 124 may be driven by a free running oscillator. Consequently, the cycle period of the residency timer 124 may vary slightly between individual integrated circuits. Therefore, each core 104 calibrates its residency timer 124 relative to the bus clock 146 frequency. More specifically, each core 104 determines the number of bus clock 146 cycles that occur for each cycle of the residency timer 124. In one embodiment, microcode 127 that runs in response to a reset of the core 104 starts the residency timer 124 and simultaneously starts the bus clock timer 122 and programs it to interrupt after a predetermined number of bus clock 146 cycles. When the bus clock timer 122 interrupts, the microcode 127 reads the residency timer 124 to determine the number of cycles that occurred on the residency timer 124 and divides the predetermined number of bus clock timer 122 cycles by the number of residency timer 124 cycles to determine the number of bus clock 146 cycles that occur for each cycle of the residency timer 124. Flow ends at block 304.

Figure 4:
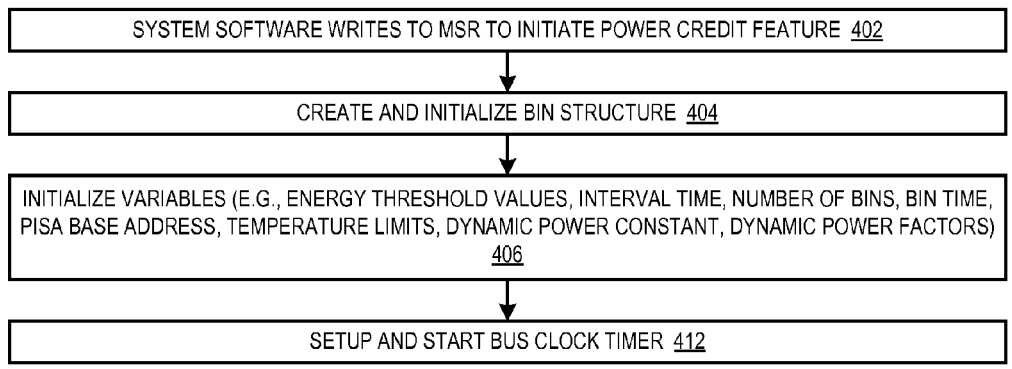

Referring now to FIG. 4, a flowchart illustrating operation of the system 100 of FIG. 1 according to the present invention is shown. Flow begins at block 402.

At block 402, the system software writes to one or more of the power credit registers 129 to initiate the power credit feature. As discussed above, the writes may specify data values associated with the power credit feature as described herein. In one embodiment, the writes to the power credit registers 129 cause invocation of the microcode 127 of FIG. 1. Flow proceeds to block 404.

At block 404, the microcode 127 creates and initializes the bin structure in response to the initialization at block 402. That is, the microcode 127 creates a bin structure comprising a circular queue of entries. The number of entries corresponds to the number of bin times in the interval (T). Each entry stores information relating to power consumption during the corresponding bin time. In one embodiment, each bin stores the amount of dynamic energy and the amount of leakage energy consumed by the core 104 during the bin time. In one embodiment, the microcode 127 initializes each of the bins with a predetermined amount of dynamic energy and leakage energy. In one embodiment, the microcode 127 creates the bin structure in a private random access memory (RAM) of the core 104 that is inaccessible to user code and is only accessible to microcode 127. The microcode 127 dynamically updates the bin structure and uses it to perform the power credit feature as described herein. Flow proceeds to block 406.

At block 406, the microcode 127 initializes variables associated with the power credit feature. The variables may also be stored within the private RAM. Many of the variables are read from the power credit registers 129. Other variables are computed. For example, the bin time is computed as the quotient of the interval T divided by the number of bins. Other maintained variables include, but are not limited to: the most recently computed interval leakage and dynamic energy for the core 104; the most recently computed interval total energy for the core 104; the time at which the bin structure was most recently updated; the threshold for which if the package 102 interval energy is below this value, the core 104 may decide to operate at an operating point above Xp (in one embodiment, there are two frequencies above Xp and there are two distinct thresholds); the threshold for which if the system software most recently requested this frequency the core 104 may decide to operate at an operating point above Xp; dynamic power factors; the index into the queue of the current bin entry; the last core 104 temperature sampled; the last core 104 voltage; the last core 104 frequency. The core 104 also determines its dynamic power constant. The dynamic power constant is the value multiplied by the frequency and by the square of the voltage to compute the dynamic power consumption of the core 104. In one embodiment, the microcode 127 computes the dynamic power constant as a function of information provided in the power credit registers 129. In one embodiment, in order to reduce the amount of calculation required, the cores 104 maintain separate dynamic and leakage energy value representations within the bin entries, within the interval, and in the PISA 138. More specifically, the values are scaled values, and the dynamic energy value does not have factored into it the dynamic power constant. Instead, the dynamic power constant is only multiplied by the interval dynamic energy representation when the final package interval energy value is computed in subroutine W (see FIG. 9). In this embodiment, the core 104 also writes the dynamic power constant value to the PISA 138 at initialization time. Flow proceeds to block 412.

At block 412, the microcode 127 sets up the bus clock timer 122 and starts it running to interrupt after a bin time has occurred. Each time a bus clock timer 122 interrupt occurs, the microcode 127 re-programs the bus clock timer 122 to generate an interrupt after a bin time has occurred. Additionally, each time the core 104 comes out of a sleeping state in which the core 104 clocks were not running, the microcode 127 re-programs the bus clock timer 122 to generate an interrupt after a bin time has occurred. Flow ends at block 412.

Figure 5A:
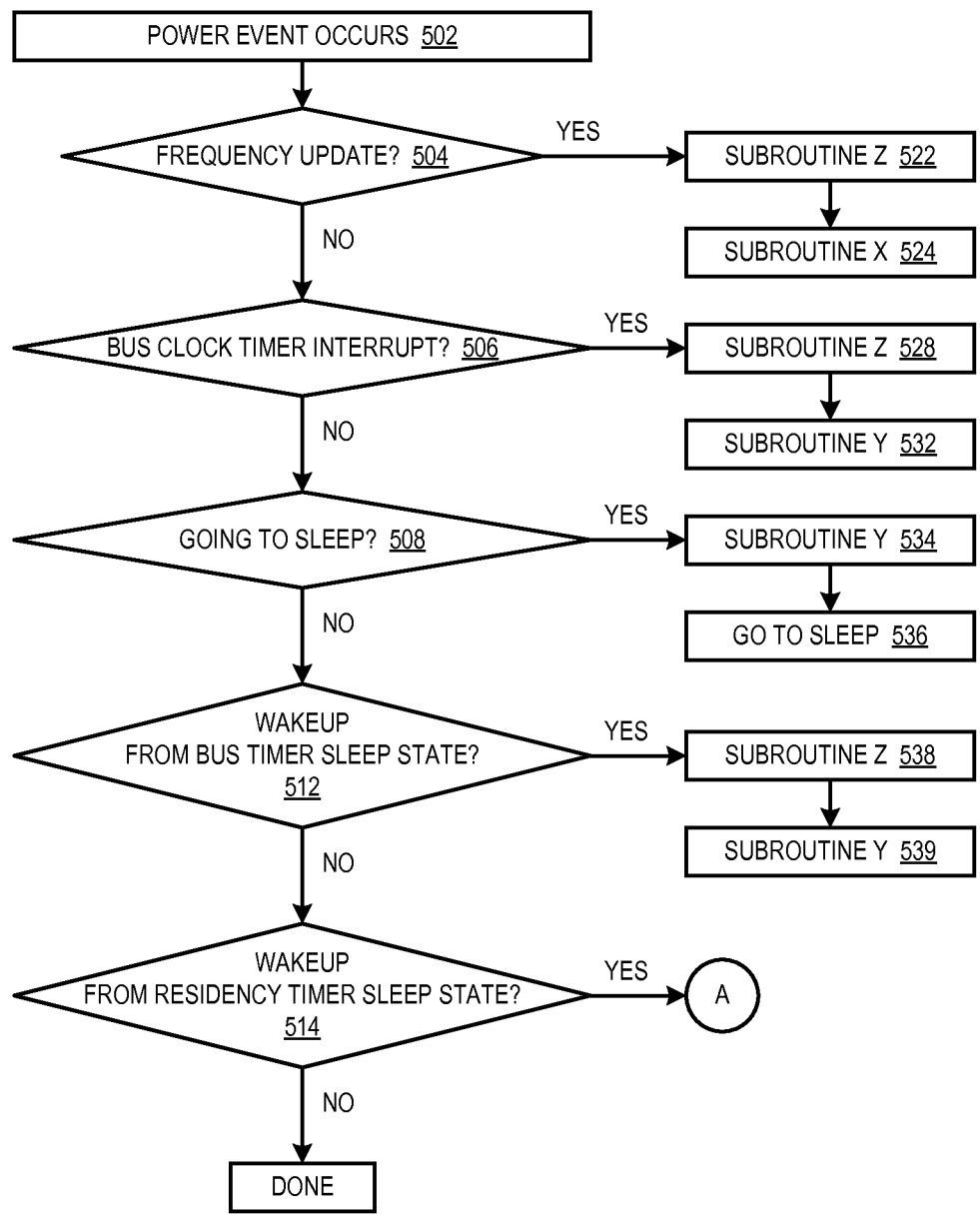
Figure 5B:
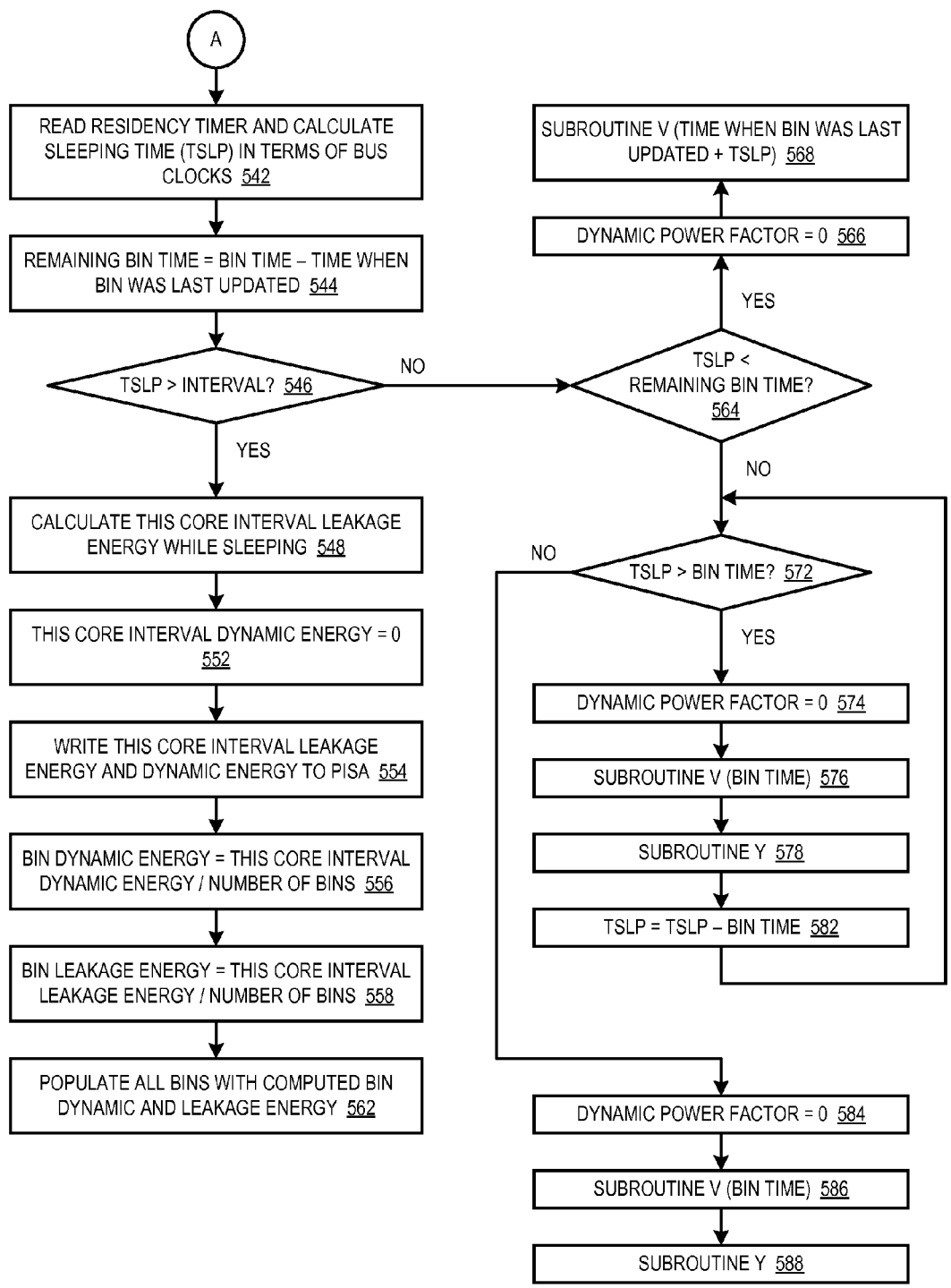

Referring now to FIG. 5, a flowchart illustrating operation of the system 100 of FIG. 1 according to the present invention is shown. FIG. 5 includes FIGS. 5A and 5B. FIG. 5A includes blocks 502 through 539, and FIG. 5B includes blocks 542 through 588. Flow begins at block 502.

At block 502, a power event occurs on a core 104. A power event may include an update to the core 104 clock frequency, an interrupt from the bus clock timer 122, the core 104 going to sleep, the core 104 waking up from a bus clock timer 122 sleeping state, or the core 104 waking up from a residency timer 124 sleeping state. In one embodiment, the power event invokes the microcode 127. Flow proceeds to decision block 504.

At decision block 504, the microcode 127 determines whether an update to the core 104 clock frequency is being performed. Examples of reasons why the microcode 127 may update the core 104 clock frequency include, but are not limited to, a request by the system software to change the P-state of the core 104 or a thermal event, such as the temperature of the core 104 rising above or dropping below predetermined thresholds. If an update to the core 104 clock frequency is being performed, flow proceeds to block 522; otherwise, flow proceeds to decision block 506.

At decision block 506, the microcode 127 determines whether a bus clock timer 122 interrupt occurred. If a bus clock timer 122 interrupt occurred, flow proceeds to block 528; otherwise, flow proceeds to decision block 508.

At decision block 508, the microcode 127 determines whether it is putting the core 104 to sleep. Going to sleep means at least that the core 104 is no longer executing user instructions. In one embodiment, sleeping states may correspond to well-known C-states. For example, the core 104 may be in a halted state, such as in response to a thermal throttling event or the execution of a HALT instruction or MWAIT instruction, referred to as the C1 C-state. Furthermore, the system 100 chipset may have asserted the STPCLK signal on the bus 154 to request permission to assert the SLP signal to cause inactivation of the core 104 clocks, referred to as C2. Until SLP is asserted, the core 104 clocks are still active and the bus clock timer 122 is still running However, once SLP is asserted, referred to as C3, the bus clock timer 122 is no longer running and the core 104 must rely on the residency timer 124 to determine how long the core 104 has been sleeping when awaken. Additionally, the core 104 may reduce its sleeping power consumption further by turning off its PLL 126, referred to as C4. Finally, the core 104 may reduce its sleeping power consumption still further by disabling a portion or all of its cache memories and disconnecting power thereto, referred to as C5. The salient point is that the core 104 is consuming less power if it is sleeping than if it is running, which the power credit feature advantageously takes into account when it calculates the total package 102 energy consumed over the most recent interval, as described herein. The system software may request the core 104 and/or package 102 to make the change to the sleeping state or the core 104 may itself initiate the change. If the core 104 is going to sleep, flow proceeds to block 534; otherwise, flow proceeds to decision block 512.

At decision block 512, the microcode 127 determines whether the core 104 is waking up from a sleep state during which the bus clock timer 122 was still operating such that the microcode 127 was capable of updating the bin structure and interval energy values. If the core 104 is waking up from a bus clock timer 122 sleep state, flow proceeds to block 538; otherwise, flow proceeds to decision block 514.

At decision block 514, the microcode 127 determines whether the core 104 is waking up from a sleep state during which the bus clock timer 122 was no longer operating such that the microcode 127 was no longer capable of updating the bin structure and interval energy values and the core 104 must rely on the residency timer 124 to determine how long the core 104 slept. If the core 104 is waking up from a residency timer 124 sleep state, flow proceeds to block 542; otherwise, flow ends.

At block 522, a subroutine referred to herein as subroutine Z is called. Subroutine Z is described in detail with respect to FIG. 6. Flow returns from subroutine Z and proceeds to block 524.

At block 524, a subroutine referred to herein as subroutine X is called. Subroutine X is described in detail with respect to FIG. 8. Flow returns from subroutine X and ends.

At block 528, subroutine Z is called. Flow returns from subroutine Z and proceeds to block 532.

At block 532, a subroutine referred to herein as subroutine Y is called. Subroutine Y is described in detail with respect to FIG. 10. Flow ends at block 532.

At block 534, subroutine Y is called. Flow returns and proceeds to block 536.

At block 536, the microcode 127 puts the core 104 to sleep. Flow ends at block 536.

At block 538, subroutine Z is called. Flow returns from subroutine Z and proceeds to block 539.

At block 539, subroutine Y is called. Flow ends at block 539.

At block 542, the microcode 127 reads the residency timer 124 and calculates the sleeping time (TSLP). In one embodiment, the microcode 127 calculates TSLP in terms of bus clock 146 cycles. Flow proceeds to block 544.

At block 544, the microcode 127 calculates the remaining time in the current bin as the difference of the bin time minus the time when the bin was last updated, which is maintained as a microcode 127 variable. Flow proceeds to decision block 546.

At decision block 546, the microcode 127 determines whether the TSLP calculated at block 544 is greater than the interval time. If so, flow proceeds to block 548; otherwise, flow proceeds to decision block 564.

At block 548, the microcode 127 calculates the leakage energy consumed by the core 104 during the interval while it was sleeping. The leakage energy is calculated as a function of the core 104 temperature provided by the temperature sensor 128 and the operating voltage. Flow proceeds to block 552.

At block 552, the microcode 127 sets the dynamic energy consumed by the core 104 during the interval while it was sleeping to zero since the core clocks were not active. Flow proceeds to block 554.

At block 554, the microcode 127 writes the core interval leakage energy and dynamic energy values calculated at blocks 548 and 552 to the power information 132 area associated with its core 104 in the PISA 138. Flow proceeds to block 556.

At block 556, the microcode 127 calculates the dynamic energy consumed by the core 104 while it was sleeping during a bin time as the quotient of the core interval dynamic energy divided by the number of bins. Flow proceeds to block 558.

At block 558, the microcode 127 calculates the leakage energy consumed by the core 104 while it was sleeping during a bin time as the quotient of the core interval leakage energy divided by the number of bins. Flow proceeds to block 562.

At block 562, the microcode 127 populates all the bin entries in the queue with the bin dynamic energy and bin leakage energy computed at blocks 556 and 558, respectively. Flow ends at block 562.

At decision block 564, the microcode 127 determines whether the TSLP is less than the remaining time in the current bin. If so, flow proceeds to block 566; otherwise, flow proceeds to decision block 572.

At block 566, the microcode 127 sets the dynamic power factor equal to zero so that the dynamic energy calculated at block 712 will be zero. Flow proceeds to block 568.

At block 568, a subroutine referred to herein as subroutine V is called with a time parameter. The time parameter is equal to the sum of the time when the current bin was last updated plus the TSLP value. Subroutine V is described in detail with respect to FIG. 7. Flow ends at subroutine V.

At decision block 572, the microcode 127 determines whether the TSLP is greater than the bin time. If so, flow proceeds to block 574; otherwise, flow proceeds to block 584.

At block 574, the microcode 127 sets the dynamic power factor equal to zero so that the dynamic energy calculated at block 712 will be zero. Flow proceeds to block 576.

At block 576, subroutine V is called with a time parameter equal to the bin time. Flow returns from subroutine V and proceeds to block 578.

At block 578, subroutine Y is called. Flow returns and proceeds to block 582.

At block 582, TSLP is decremented by the bin time. Advantageously, the loop from blocks 572 through 582 and the stream at blocks 584 through 588 handle the possibility that the core 104 may have been in a sleeping state in which the core clocks are not running for multiple bin times, and this must be accounted for in the process of updating the bin structure. Flow returns to decision block 572.

At block 584, the microcode 127 sets the dynamic power factor equal to zero so that the dynamic energy calculated at block 712 will be zero. Flow proceeds to block 586.

At block 586, subroutine V is called with a time parameter equal to the bin time. Flow returns from subroutine V and proceeds to block 588.

At block 588, subroutine Y is called. Flow ends at block 588.

Figure 6:
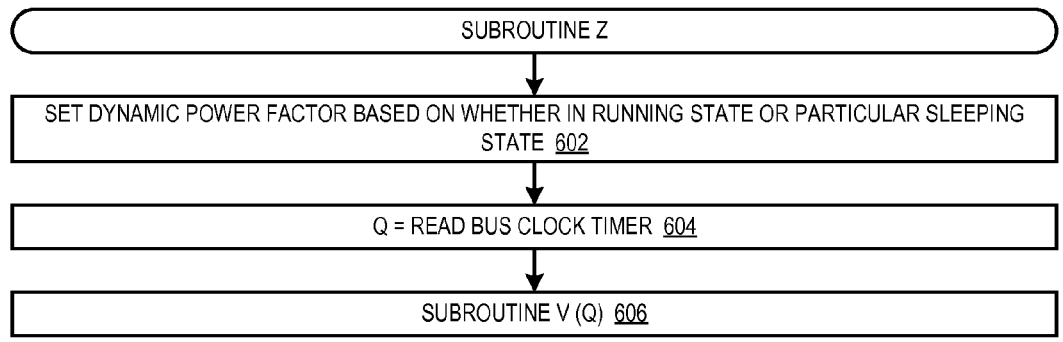

Referring now to FIG. 6, a flowchart illustrating operation of the system 100 of FIG. 1 to perform subroutine Z according to the present invention is shown. Flow begins at block 602.

At block 602, the microcode 127 sets the dynamic power factor based on whether the core 104 was in the running state or a particular sleeping state. The dynamic power factor of the running state is one, and each successively lower sleeping state has a smaller dynamic power factor since typically the core 104 consumes less power while in each successively lower sleeping state. For example, the dynamic power factor of the C1 state is a fraction of the running state dynamic power factor, since in the C1 state, although the product computed at block 712 may be the same as the running state because the dynamic power constant, voltage and frequency may be the same, the core 104 is likely consuming less power since it is halted from executing instructions. Additionally, in one embodiment, a leakage power factor is incorporated and used at block 708. For example, the leakage power factor of the C4 state is smaller than the C3 state leakage power factor, since in the C4 state the core 104 is likely consuming less power since the PLL 126 is disabled, and the leakage power factor of the C5 state is smaller than the C4 state leakage power factor, since in the C5 state the core 104 is likely consuming less power since the cache memory voltage is disabled. Flow proceeds to block 604.

At block 604, the microcode 127 reads the bus clock timer 122 to determine how long the core 104 has been running since the beginning of the current bin time. Flow proceeds to block 606.

At block 606, subroutine V is called with the value read from the bus clock timer 122 at block 604. Flow ends at block 606.

Figure 7:
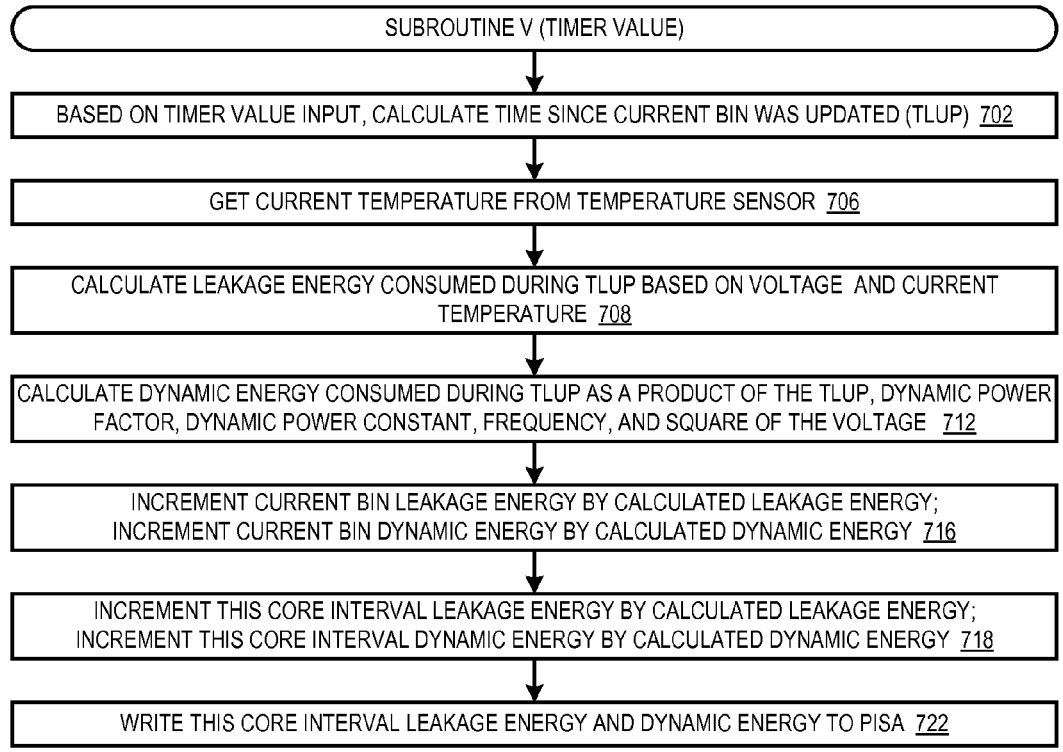

Referring now to FIG. 7, a flowchart illustrating operation of the system 100 of FIG. 1 to perform subroutine V according to the present invention is shown. Flow begins at block 702.

At block 702, the microcode 127 calculates the time since the current bin was last updated (TLUP) based on the timer value input passed to subroutine V, which may be the value read from the bus clock timer 122 at block 604 of FIG. 6 or a value passed from block 568, 576, or 586 of FIG. 5. Flow proceeds to block 706.

At block 706, the microcode 127 reads the temperature sensor 128 to get the current temperature. Flow proceeds to block 708.

At block 708, the microcode 127 calculates the leakage energy consumed during the TLUP based on the voltage and current temperature. Flow proceeds to block 712.

At block 712, the microcode 127 calculates the dynamic energy consumed by the core 104 during the TLUP as a product of the TLUP, its frequency, dynamic power constant, dynamic power factor, and square of its voltage. In one embodiment, the microcode 127 calculates and uses the average of the old and new voltage and the average of the old and new frequency. In most instances, such as when a bus clock timer 122 interrupt occurs, the old voltage and frequency will be the same as the new voltage and frequency such that the averages will be the same as the current values. However, in the case of a change of frequency and/or voltage, the averages will be different. Flow proceeds to block 716.

At block 716, the microcode 127 increments the current bin leakage energy by the leakage energy calculated at block 708. Additionally, the microcode 127 increments the current bin dynamic energy by the dynamic energy calculated at block 712. Advantageously, since the values in the PISA 138 are at most one bin time old, and the number of bins is relatively large (in one embodiment there are 128 bins), the potential inaccuracy in the values attributable to the quantization of the interval (T) is typically relatively small (on the order of 1%). Flow proceeds to block 718.

At block 718 the microcode 127 increments the current interval leakage energy for this core 104 by the leakage energy calculated at block 708. Additionally, the microcode 127 increments the current interval dynamic energy for this core 104 by the dynamic energy calculated at block 712. Flow proceeds to block 722.

At block 722, the microcode 127 writes the leakage energy and dynamic energy for this core 104 calculated at block 718 to the PISA 138. Flow ends at block 722.

Figure 8:
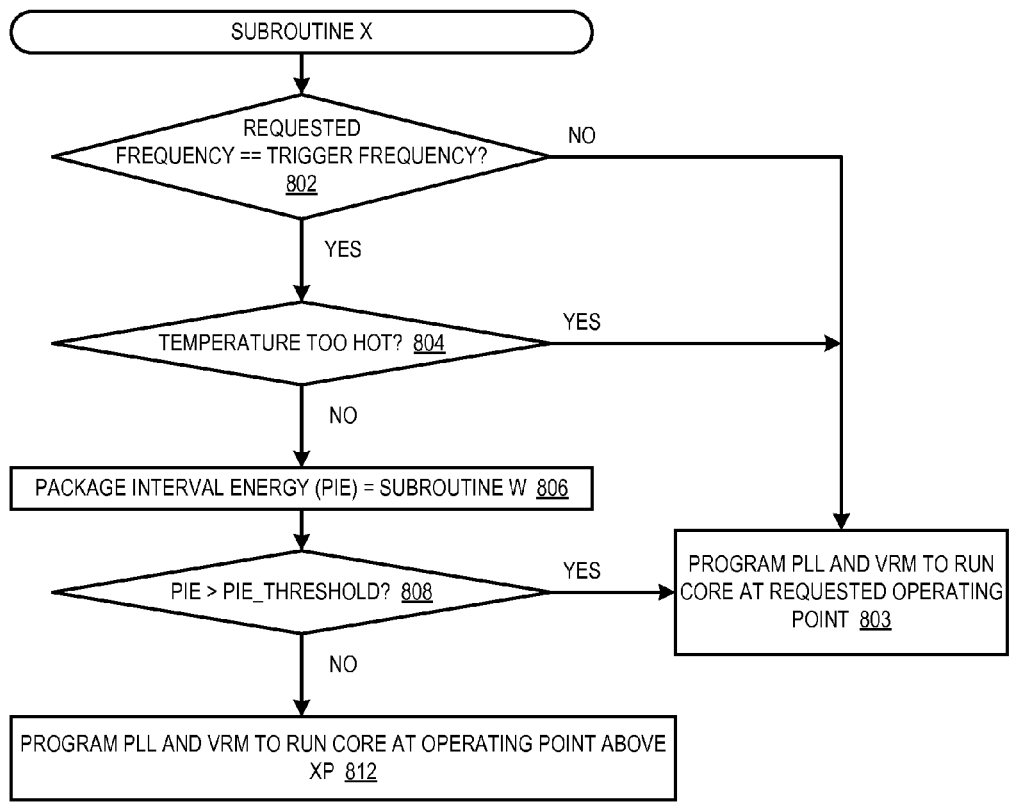

Referring now to FIG. 8, a flowchart illustrating operation of the system 100 of FIG. 1 to perform subroutine X according to the present invention is shown. Flow begins at decision block 802.

At decision block 802, the microcode 127 determines whether the requested frequency equals the power credit feature trigger frequency. If so, flow proceeds to decision block 804; otherwise, proceeds to block 803.

At block 803, the microcode 127 controls the VRM 108 and the core 104 PLL 126 to cause the core 104 to run at the requested P-state. In one embodiment, a comparator compares the VID output of the two cores 104 and selects the larger of the two values if they are different. Flow ends at block 803.

At decision block 804, the microcode 127 obtains the core 104 temperature from the temperature sensor 128 and determines whether the core 104 temperature is above a predetermined temperature threshold. In one embodiment, the temperature threshold is provided in the power credit registers 129. If the core 104 temperature is above the predetermined temperature threshold, flow proceeds to block 803; otherwise, flow proceeds to block 806.

At block 806, a subroutine referred to herein as subroutine W is called. Subroutine W is described in detail with respect to FIG. 9. Flow returns from subroutine W, which returns a value that is the calculated energy consumed by the package 102 over the most recent interval, or package interval energy (PIE). Flow proceeds to decision block 808.

At decision block 808, the microcode 127 determines whether the PIE received at block 806 is greater than a predetermined energy threshold. Preferably, the predetermined energy threshold is slightly less than the product of the maximum power consumption (P) and the time interval (T). In other embodiments, the predetermined energy threshold may be additionally reduced by an amount of energy consumed by circuits of the microprocessor 100 outside the cores 104 that consume a significant amount of power, such as a shared cache memory; alternatively, subroutine W may include in the PIE calculation the amount of energy consumed by the circuits of the microprocessor 100 outside the cores 104. In one embodiment, the predetermined energy threshold is provided in the power credit registers 129. If the PIE is greater than the predetermined energy threshold, flow proceeds to block 803; otherwise, flow proceeds to block 812.

At block 812, the microcode 127 advantageously controls the VRM 108 and the core 104 PLL 126 to cause the core 104 to operate at an operating point above Xp. Flow ends at block 812.

Figure 9:
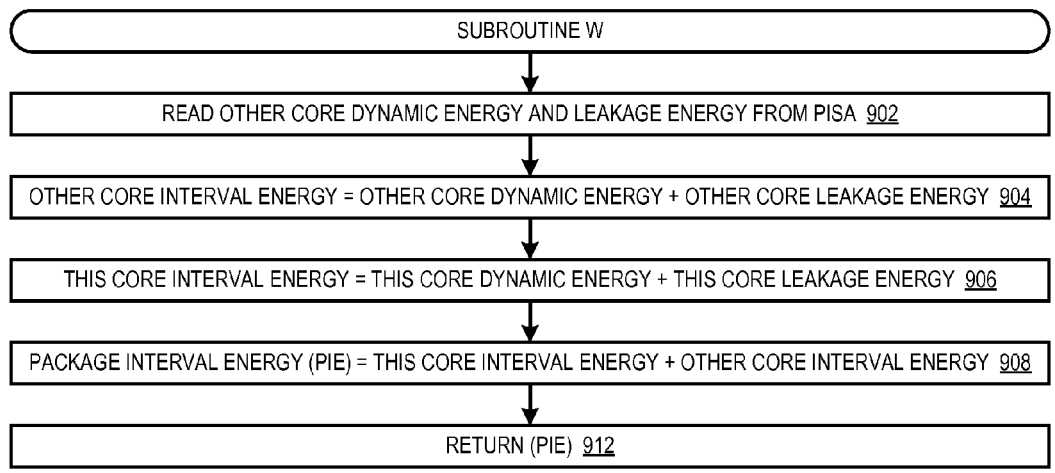

Referring now to FIG. 9, a flowchart illustrating operation of the system 100 of FIG. 1 to perform subroutine W according to the present invention is shown. Flow begins at block 902.

At block 902, the microcode 127 reads the interval dynamic energy and interval leakage energy of the other core 104 from the PISA 138. It is noted that in an embodiment with more than two cores 104, the microcode 127 would read these values for each of the other cores and use them in the subsequent calculations below at blocks 904 and 908 to calculate the package 102 interval energy. Flow proceeds to block 904.

At block 904, the microcode 127 uses the values obtained at block 902 to calculate the interval energy for the other core 104 as the sum of the other core's 104 leakage energy and the other core's 104 dynamic energy. Flow proceeds to block 906.

At block 906, the microcode 127 calculates the interval energy for this core 104 as the sum of this core's 104 leakage energy and this core's 104 dynamic energy. Flow proceeds to block 908.

At block 908, the microcode 127 calculates the package 102 interval energy as the sum of the other core's 104 interval energy calculated at block 904 and this core's 104 interval energy calculated at block 906. Flow proceeds to block 912.

At block 912, the microcode 127 returns the package 102 interval energy calculated at block 908. Flow ends at block 912.

Figure 10:
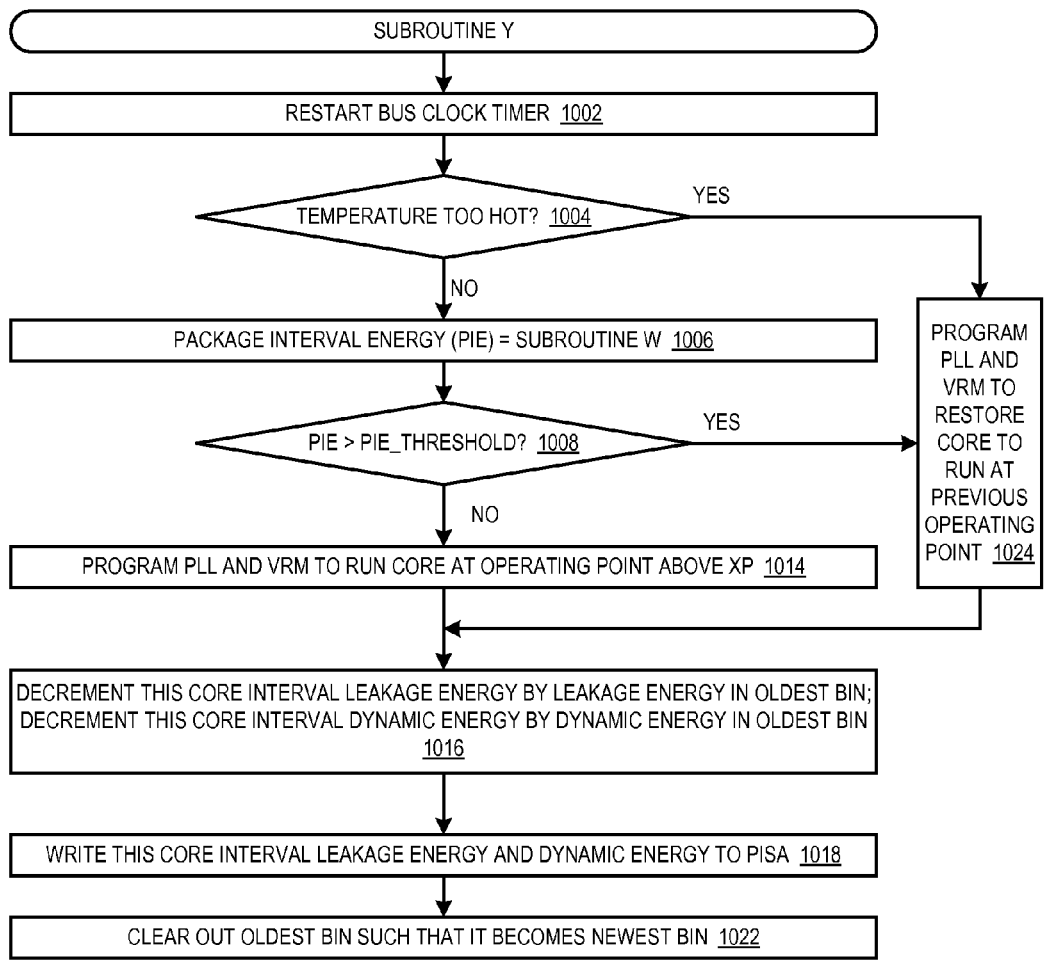

Referring now to FIG. 10, a flowchart illustrating operation of the system 100 of FIG. 1 to perform subroutine Y according to the present invention is shown. Flow begins at block 1002.

At block 1002, the microcode 127 restarts the bus clock timer 122. That is, the microcode 127 programs the bus clock timer 122 to run for another bin time and then generate an interrupt to the core 104. Flow proceeds to decision block 1004.

At decision block 1004, the microcode 127 obtains the core 104 temperature from the temperature sensor 128 and determines whether the core 104 temperature is above the predetermined temperature threshold. If so, flow proceeds to block 1024; otherwise, flow proceeds to block 1006.

At block 1006, subroutine W is called. Flow returns from subroutine W with the calculated energy consumed by the package 102 over the most recent interval (PIE). Flow proceeds to decision block 1008.

At decision block 1008, the microcode 127 determines whether the PIE received at block 1006 is greater than the predetermined energy threshold. If so, flow proceeds to block 1024; otherwise, flow proceeds to block 1014.

At block 1014, the microcode 127 advantageously controls the VRM 108 and the core 104 PLL 126 to cause the core 104 to operate at an operating point above Xp. In one embodiment, a comparator compares the VID output of the two cores 104 and selects the larger of the two values if they are different. Flow proceeds to block 1016.

At block 1016, the microcode 127 decrements the current interval leakage energy for this core 104 by the leakage energy specified in the oldest bin entry in the queue. Thus, by the operation of block 718 of FIG. 7 and block 1016 of FIG. 10, the current interval leakage energy for this core 104 is calculated more efficiently than summing the leakage energy in all the bins. Similarly, the microcode 127 decrements the current interval dynamic energy for this core 104 by the dynamic energy specified in the oldest bin entry in the queue. Flow proceeds to block 1018.

At block 1018, the microcode 127 writes the leakage energy and dynamic energy for this core 104 calculated at block 1016 to the PISA 138. Flow proceeds to block 1022.

At block 1022, the microcode 127 clears out the oldest bin in the queue such that it becomes the newest bin, or current bin. Flow ends at block 1022.

At block 1024, the microcode 127 controls the VRM 108 and the core 104 PLL 126 to cause the core 104 to operate at its previous operating point, which may be at Xp or below. Flow proceeds to block 1016.

As may be observed from the foregoing description, advantageously all of the cores may operate at a frequency above Xp as long as enough power credits have been accumulated, i.e., if during a time period all the cores 104 determine that the package interval energy does not exceed the predetermined energy threshold. This may be superior to a multi-core processor that simply relies on a much coarser indicator to operate one or more of the cores at an elevated frequency, such as whether one of the cores is asleep, since such an approach would not enable all of the cores to operate at an elevated frequency.

Figure 11:
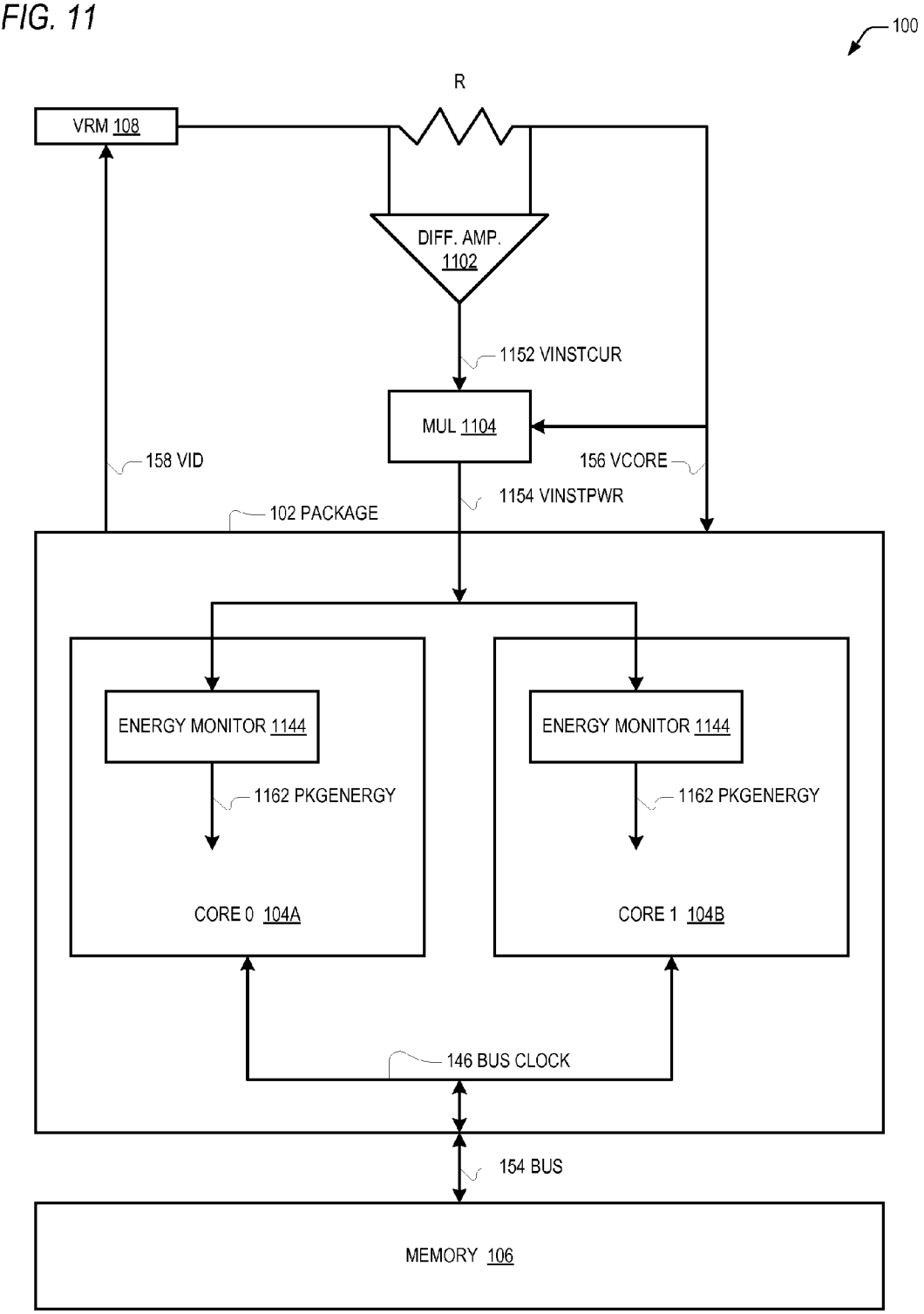
FIG. 11 is a block diagram illustrating a computing system including a dual-core microprocessor package that includes a power credit feature according to an alternate embodiment of the present invention.

Referring now to FIG. 11, a block diagram illustrating a computing system 100 including a dual-core microprocessor package 102 that includes a power credit feature according to an alternate embodiment of the present invention is shown. The system 100 of FIG. 11 is similar to the system 100 of FIG. 1 in many respects in that it includes the package 102 coupled to the memory 106 by the bus 154 and to the VRM 108, and the package 102 includes the two cores 104. However, the means by which the package 102 energy consumption is determined (for the purpose of the power credit feature) is different in the system 100 of FIG. 11 than in the system 100 of FIG. 1. The cores 104 in the system 100 of FIG. 1 calculate their power consumption (energy consumption rate) based on various inputs such as voltage, frequency, and temperature, in order to calculate the energy consumption over the interval, the system 100 of FIG. 11 includes circuitry outside the package 102 that provides an instantaneous power consumption indication VINSTPWR 1154 that the cores 104 use to calculate the energy consumption over the interval. Additionally, each core 104 includes an energy monitor 1144 that samples the VINSTPWR 1154 signal and accumulates the amount of energy consumed from the VCORE 156 signal in the time between each read of the energy monitor 1144. The accumulated energy is readable by the microcode 127 as a value PKGENERGY 1162.

The circuitry outside the package 102 includes a series resistor (R) on the VRM 108 output VCORE 156 and a differential amplifier 1102 across the resistor that generates a VINSTCUR signal 1152. VINSTCUR 1152 is an analog voltage signal whose value is proportional to the instantaneous current being supplied to the package 102 via VCORE 156. An analog multiplier 1104 also receives VCORE 156 and multiplies it by VINSTCUR 1152 to generate the VINSTPWR 1154 signal. VINSTPWR 1154 is an analog voltage whose value is proportional to the instantaneous power being supplied to the package 102 via VCORE 156. The energy monitor 1144 in each core 104 converts the VINSTPWR signal 1154 into a digital signal PKGENERGY 1162. The energy monitor 1144 includes a status register that the microcode 127 can read to obtain the value of PKGENERGY 1162. PKGENERGY 1162 indicates the amount of energy provided on VCORE 156 since the last time the energy monitor 1144 was read. That is, each time the microcode 127 reads the PKGENERGY 1162 value from the energy monitor 1144, the energy monitor 1144 resets the energy value to zero and begins anew accumulating the energy consumed by the package 102 until the next time the microcode 127 reads the PKGENERGY 1162 value. The energy monitor 1144 converts the analog voltage value of VINSTPWR 1154 into the value of the instantaneous power being provided to the package 102 by dividing by the value of the resistor R (and multiplying by a fractional constant if the differential amplifier amplifies the VINSTCUR signal 1152).

Figure 12:
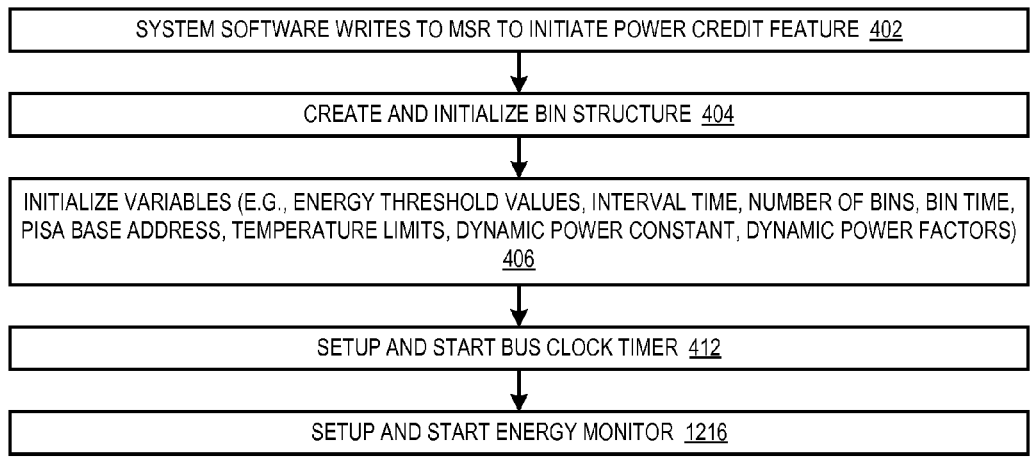
FIGS. 12-17 are flowcharts illustrating operation of the system of FIG. 1 according to the present invention.

Referring now to FIG. 12, a flowchart illustrating operation of the system 100 of FIG. 11 according to an alternate embodiment of the present invention is shown. The flowchart of FIG. 12 is similar to the flowchart of FIG. 4. However, in FIG. 12, flow proceeds from block 412 to new block 1216.

At block 1216, the microcode 127 of each core 104 writes control registers within its respective energy monitor 1144 to set up and start the energy monitor 1144 accumulating the package 102 energy consumption. Flow ends at block 1216.

Figure 13:
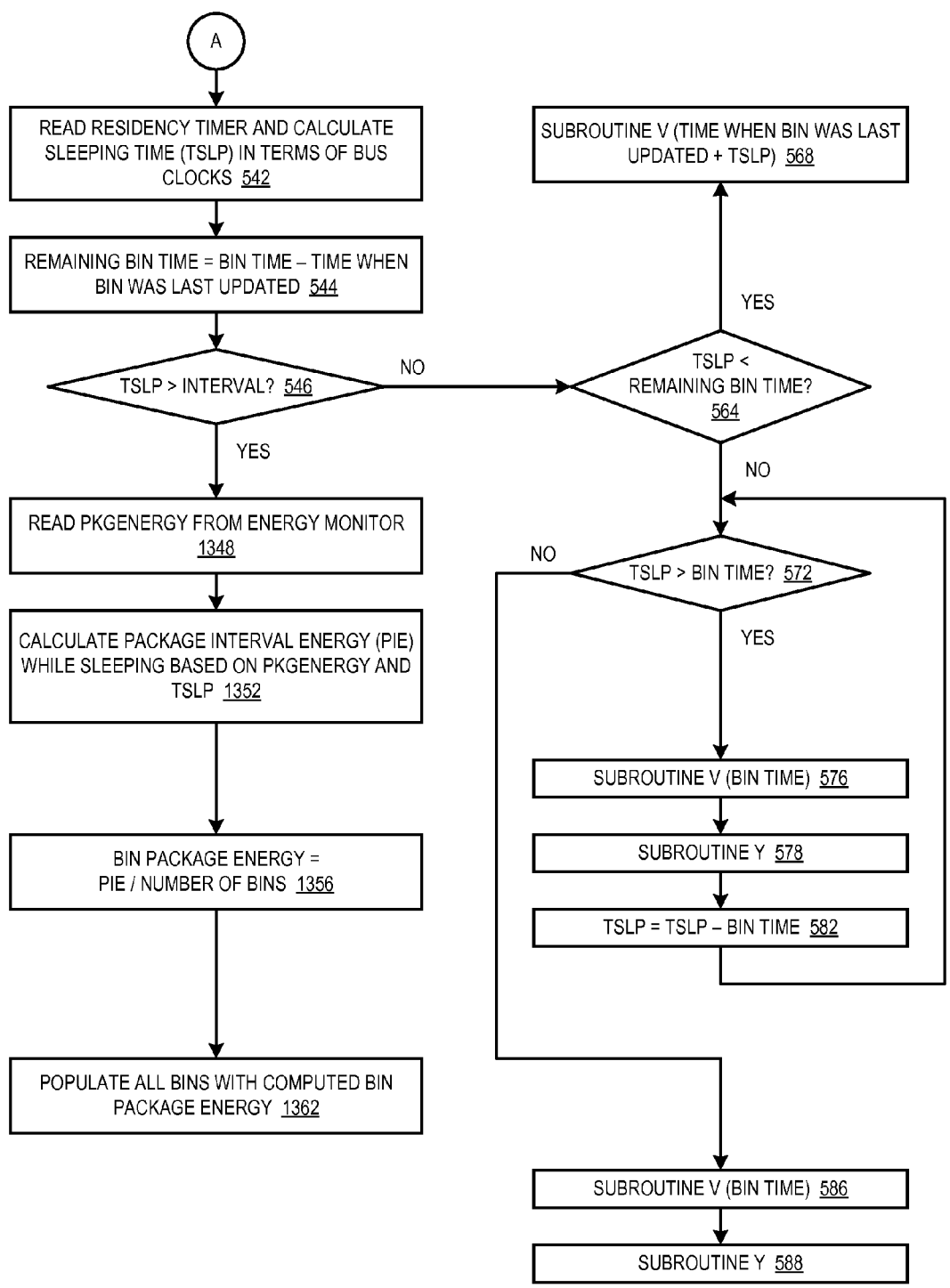

Referring now to FIG. 13, a flowchart illustrating operation of the system 100 of FIG. 11 according to an alternate embodiment of the present invention is shown. The flowchart of FIG. 13 is similar to the flowchart of FIG. 5B. However, the following differences will now be described.

Blocks 566, 574, and 584 are not present in FIG. 13 such that flow proceeds directly from the "yes" branch of decision block 564 to block 568; flow proceeds directly from the "yes" branch of decision block 572 to block 576; and flow proceeds directly from the "no" branch of decision block 576 to block 586. Additionally, blocks 548, 552, 556, and 562 are replaced by respective new blocks 1348, 1352, 1356, and 1362. Finally, 554 and 558 are not present in FIG. 13 and are not replaced; consequently, flow proceeds from block 1352 directly to block 1356 and from block 1356 directly to block 1362.

If at block 546, the microcode 127 determines that the TSLP calculated at block 544 is greater than the interval time, flow proceeds to a new block 1348.

At block 1348, the microcode 127 reads the PKGENERGY 1162 value from the energy monitor 1144. Flow proceeds to new block 1352.

At block 1352, the microcode 127 calculates the package interval energy (PIE) consumed by the package 102 during the interval while the core 104 was sleeping based on the PKGENERGY 1162 value obtained at block 1348 and the TSLP value obtained at block 542. In one embodiment, the interval and TSLP values are in units of bus clock 146 ticks, and the PIE value is calculated as the product of the PKGENERGY value and a fraction whose numerator is the interval and whose denominator is TSLP. Flow proceeds from block 1352 to block 1356.

At block 1356, the microcode 127 calculates the bin energy consumed by the package 102 while the core 104 was sleeping during a bin time as the quotient of the PIE determined at block 1352 divided by the number of bins. Flow proceeds from block 1356 to block 1362.

At block 1362, the microcode 127 populates all the bin entries in the queue with the bin package 102 energy computed at block 1356. Flow ends at block 1362.

Figure 14:
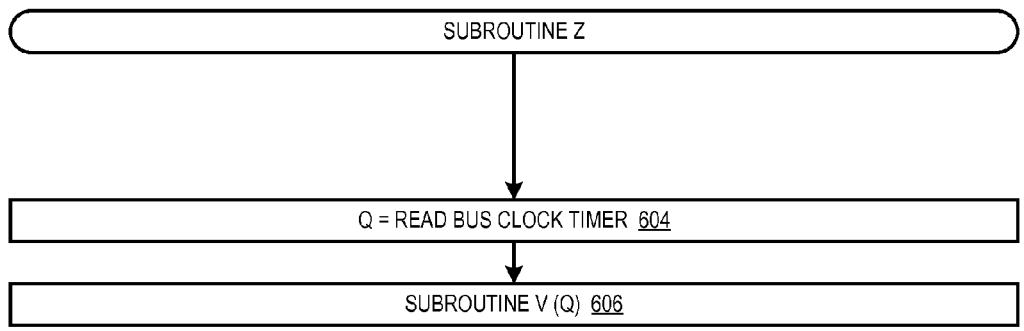

Referring now to FIG. 14, a flowchart illustrating operation of the system 100 of FIG. 11 to perform subroutine Z according to an alternate embodiment of the present invention is shown. FIG. 14 the same as FIG. 6, except FIG. 14 does not include block 602 such that flow begins at block 604. That is, the alternate embodiment of FIG. 14 does not employ the dynamic power factors of the embodiment of FIG. 1. The dynamic power factors are not needed because the actual instantaneous power value is provided to the cores 104 via the VINSTPWR 1154 signal.

Figure 15:
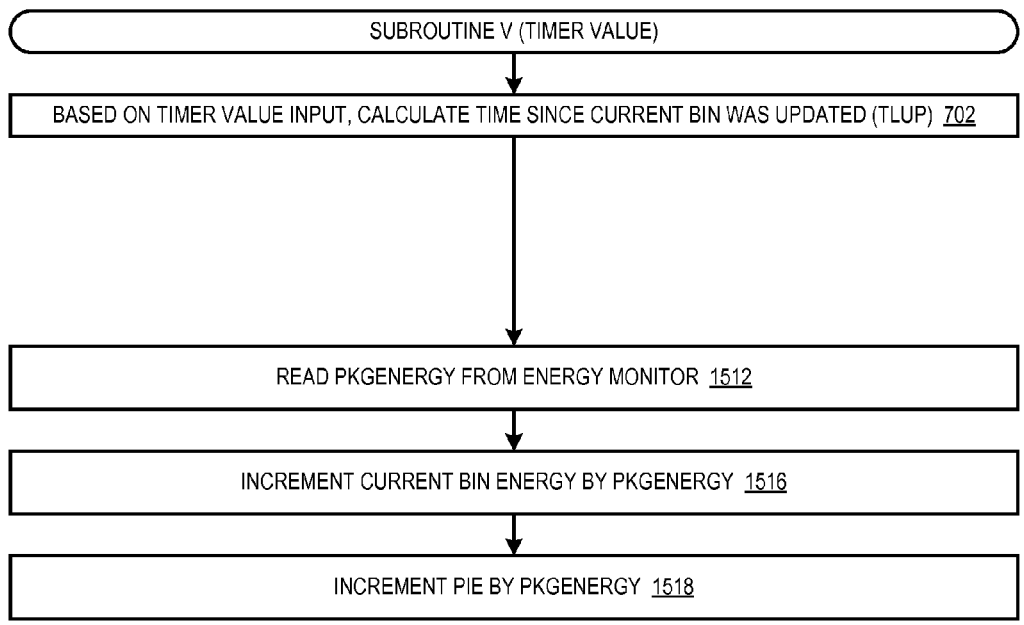

Referring now to FIG. 15, a flowchart illustrating operation of the system 100 of FIG. 11 to perform subroutine V according to an alternate embodiment of the present invention is shown. Flow begins at block 702, which is similar to block 702 of FIG. 7. Flow proceeds to block 1512.

At block 1512, the microcode 127 reads the PKGENERGY 1162 value from the energy monitor 1144 to determine the energy consumed by the package 102 during the TLUP. Flow proceeds to block 1516.

At block 1516, the microcode 127 increments the current bin energy by the PKGENERGY 1162 value obtained at block 1512. Advantageously, since the number of bins is relatively large (in one embodiment there are 128 bins), the potential inaccuracy in the values attributable to the quantization of the interval (T) is typically relatively small (on the order of 1%). Flow proceeds to block 1518.

At block 1518, the microcode 127 increments the PIE by the PKGENERGY 1162 value obtained at block 1512. Flow ends at block 1518.

Figure 16:
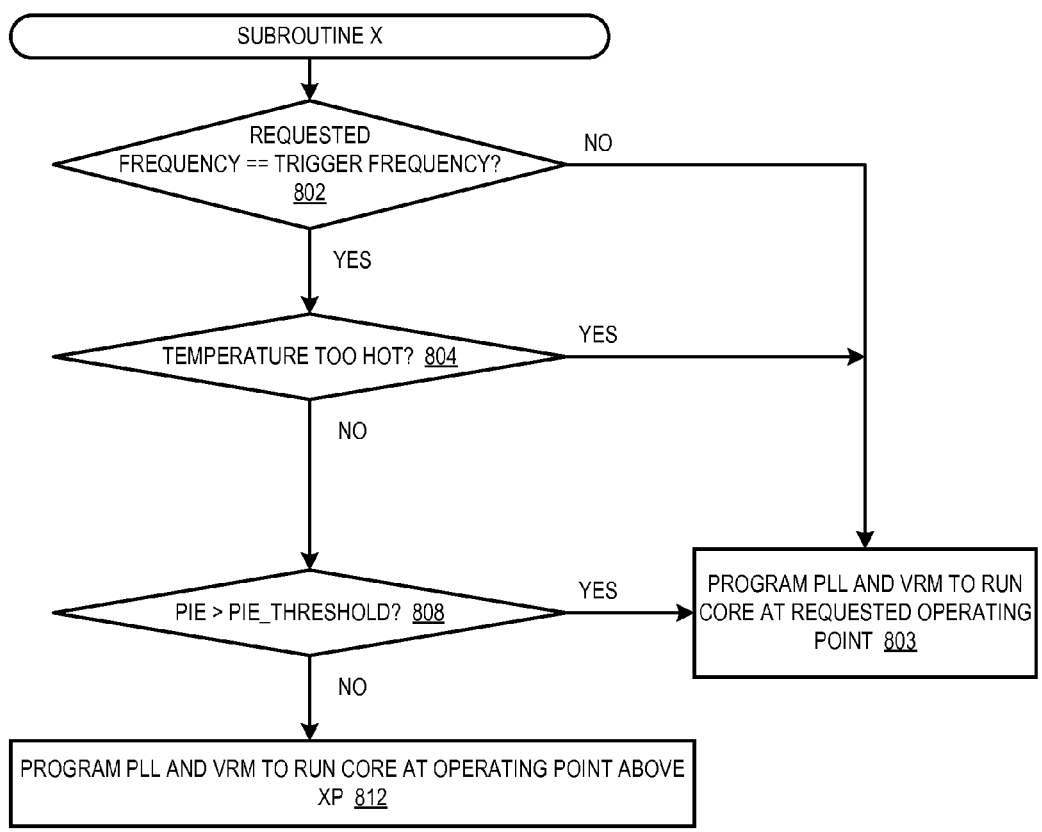

Referring now to FIG. 16, a flowchart illustrating operation of the system 100 of FIG. 11 to perform subroutine X according to an alternate embodiment of the present invention is shown. FIG. 16 the same as FIG. 8, except FIG. 16 does not include block 806; consequently, flow proceeds from the "no" branch of decision block 804 directly to decision block 808. That is, the alternate embodiment of FIG. 16 does not require a calculation of the PIE as does the embodiment of FIG. 1. This is because the PIE is maintained effectively each time the PKGENERGY 1162 is read from the energy monitor 1144. Furthermore, it is noted that subroutine W is not needed in the alternate embodiment of FIG. 11 because the PIE is maintained effectively each time the PKGENERGY 1162 is read from the energy monitor 1144.

Figure 17:
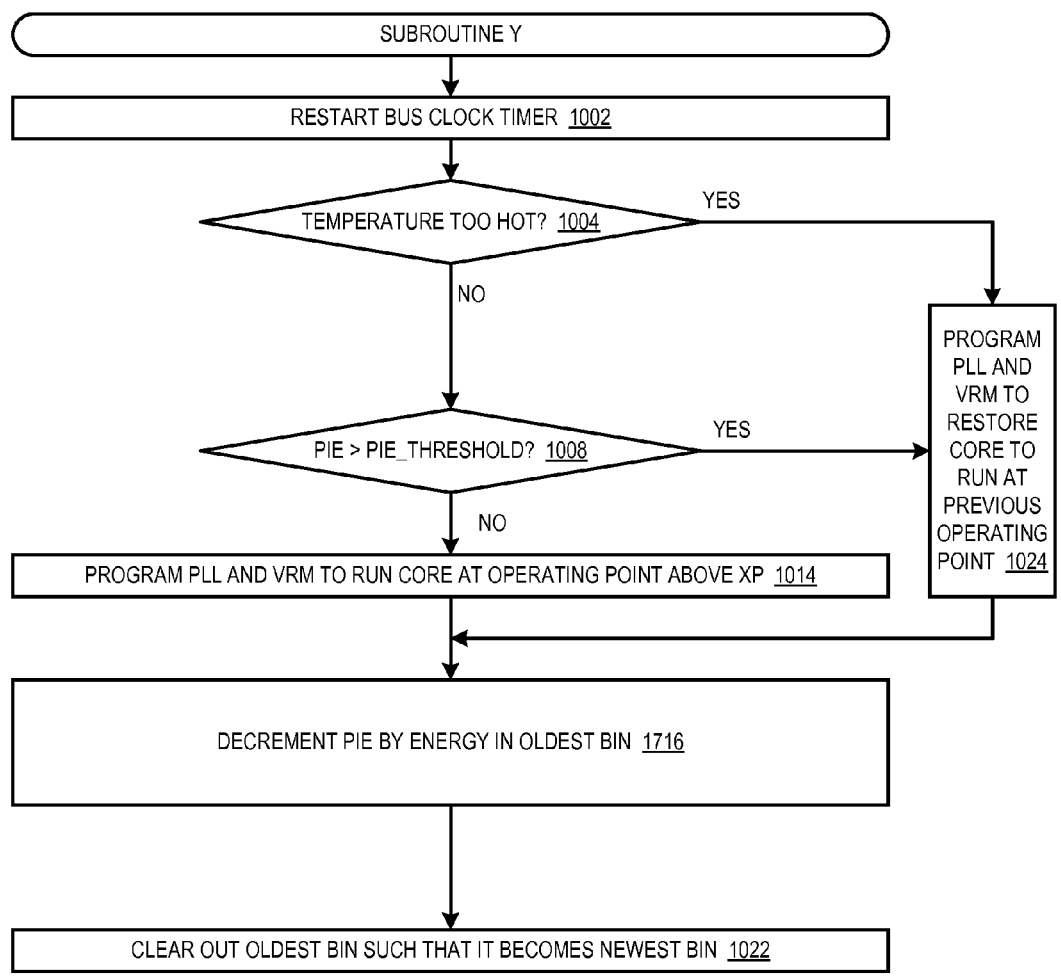

Referring now to FIG. 17, a flowchart illustrating operation of the system 100 of FIG. 11 to perform subroutine Y according to an alternate embodiment of the present invention is shown. FIG. 17 is similar to FIG. 10 with the following differences.

FIG. 17 does not include block 1006; consequently, flow proceeds from the "no" branch of decision block 1004 directly to decision block 1008. That is, the alternate embodiment of FIG. 17 does not require a calculation of the PIE as does the embodiment of FIG. 1. This is because the PIE is maintained effectively each time the PKGENERGY 1162 is read from the energy monitor 1144.

Additionally, block 1016 of FIG. 10 is replaced in FIG. 17 by block 1716 such that flow proceeds from blocks 1014 and 1024 to block 1716.

At block 1716, the microcode 127 decrements the PIE by the energy specified in the oldest bin entry in the queue. Thus, by the operation of block 1518 of FIG. 15 and block 1716 of FIG. 17, the PIE is calculated more efficiently than summing the energy in all the bins. FIG. 17 does not include block 1018; consequently, flow proceeds from block 1716 directly to block 1022.

Figure 18:
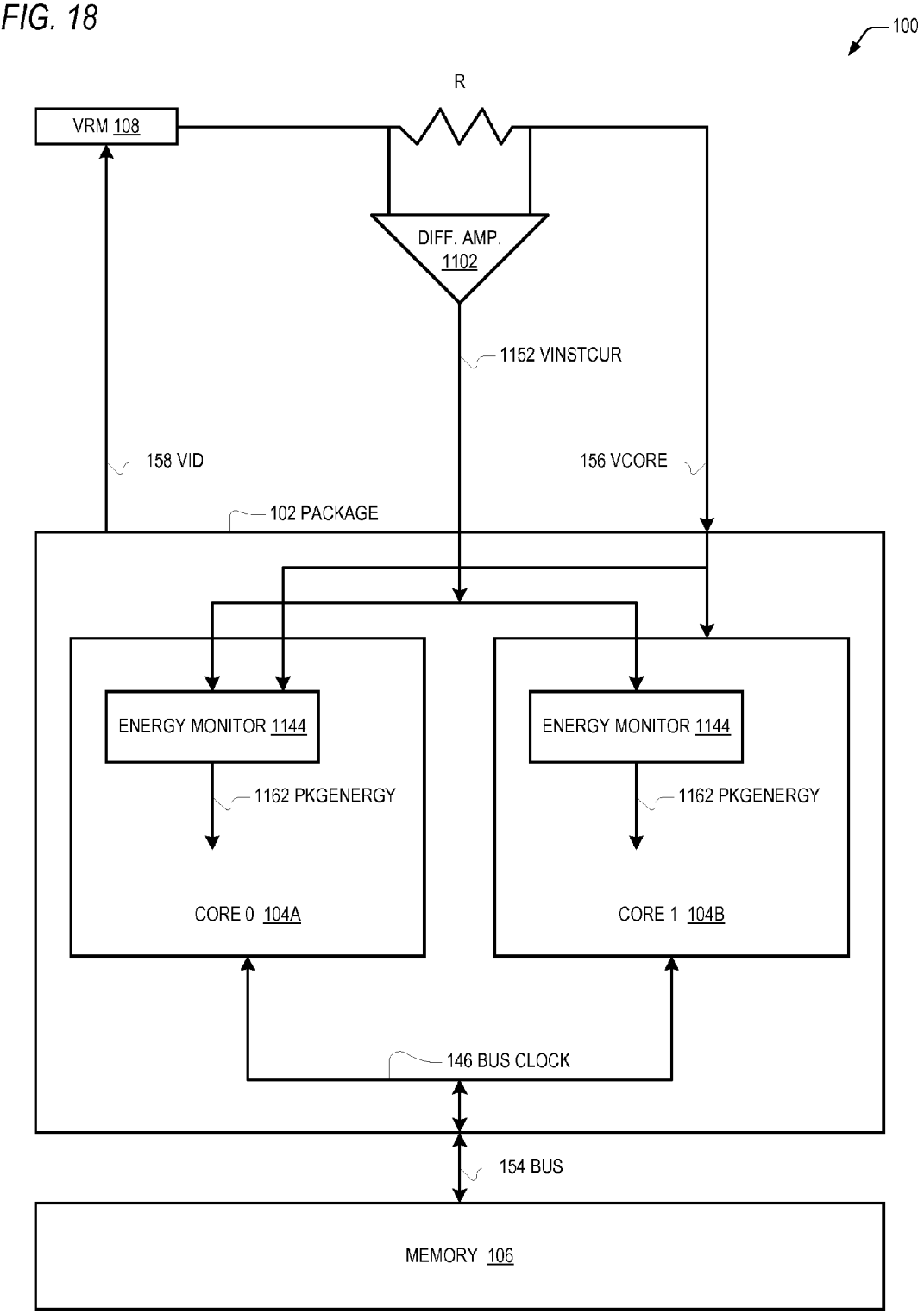
FIG. 18 is a block diagram illustrating a computing system including a dual-core microprocessor package that includes a power credit feature according to an alternate embodiment of the present invention.

Referring now to FIG. 18, a block diagram illustrating a computing system 100 including a dual-core microprocessor package 102 that includes a power credit feature according to an alternate embodiment of the present invention is shown. The system 100 of FIG. 18 is similar to the system 100 of FIG. 11. However, the system 100 of FIG. 18 does not include the analog multiplier 1104 of FIG. 4. Instead, the energy monitors 1144 perform the analog multiplication function. That is, the energy monitors 1144 each receive the VINSTCUR 1152 signal and the VCORE 156 signal.

Various advantages of the embodiments described herein may be appreciated. First, one possible solution for enabling the cores to communicate power information with one another is to manufacture the two cores as a matched pair and manufacture wires directly between them that enable them to communicate with one another. However, an advantage of the embodiments in which the cores communicate through memory is that the cores need not be manufactured as a matched pair, but may instead be manufactured separately and then packaged together later. Therefore, the solution of the embodiments may have a much higher yield than the matched pair solution.

Second, using memory for the cores to communicate the power information may scale better to more than two cores than a solution in which the cores communicate via wires directly between the cores since the number of wires would grow exponentially as the number of cores increases.

Third, an advantage of the power credit feature embodiments described herein is that they allow the user/system that has a good thermal environment/solution to enjoy extra performance without penalizing that user/system just because there are other users/systems that might operate in a bad thermal environment/solution.

Fourth, there are some instructions (e.g., transcendental function instructions or modulo multiply instructions with extremely large operands) that may run for a relatively very long time, possibly a time that is on the order of magnitude of the bin time or even the T interval. Because, according to the embodiments described herein, one core can determine whether the necessary power credits are present for the entire package and adjust its own performance accordingly, the embodiments described herein may operate properly even in the presence of a long instruction, i.e., even if the other core is not able to respond to its bus clock timer interrupt.

Fifth, as may be observed from the foregoing description, all of the cores may operate at a frequency above Xp as long as enough power credits have been accumulated.

Although the present invention and its objects, features, and advantages have been described in detail, other embodiments are encompassed by the invention. For example, although embodiments have been described in which the instantaneous power indication is provided from the circuitry external to the package in the embodiments of FIGS. 11 and 18 with respect to a multi-core configuration, single core package embodiments are also contemplated. Furthermore, although embodiments have been described in which the dynamic and leakage energy value representations are maintained separately, other embodiments are contemplated in which a single energy value representation is maintained. Additionally, in alternate embodiments, the VINSTPWR signal 1154 or the VINSTCUR 1152 signal is provided to the package 102 directly from the VRM 108, or from the power supply. Finally, although embodiments have been described in which the power credit feature is largely implemented in microcode, other embodiments are contemplated in which the power credit feature is largely implemented in hardware logic or a combination of microcode and hardware logic.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   two or more processing cores, wherein each processing core is configured to:
      determine, at each of succeeding instances in time, an amount of energy consumed by the microprocessor during a period preceding the instance in time, wherein the period is a predetermined length of time; and
      operate the processing core at a frequency above a predetermined frequency in response to determining that the amount of energy consumed by the microprocessor during the period preceding the instance in time is less than a predetermined amount of energy;
   wherein the microprocessor is configured such that all of the two or more processing cores may operate above the predetermined frequency simultaneously until one of the two or more processing cores determines that the microprocessor has consumed more than the predetermined amount of energy during the period preceding the instance in time.

2. The microprocessor of claim 1, wherein the predetermined frequency is a frequency at which all of the two or more processing cores of the microprocessor can operate over the predetermined length of time without the microprocessor consuming more than the predetermined amount of energy.

3. The microprocessor of claim 1, wherein the predetermined frequency is the maximum frequency at which system software may request the two or more processing cores to operate.

4. The microprocessor of claim 1, wherein each processing core comprises microcode configured to cause the processing core to operate at the frequency above the predetermined frequency in response to determining that the amount of energy consumed by the microprocessor during the period preceding the instance in time is less than the predetermined amount of energy.

5. The microprocessor of claim 4, wherein the microcode is further configured to determine the amount of energy consumed by the microprocessor during the period preceding the instance in time.

6. The microprocessor of claim 1, wherein each processing core includes a timer that keeps time while the processing core is in a sleep state in which clocks to a substantial portion of the processing core are disabled, wherein the processing core is further configured to:
  calculate the amount of energy consumed by the processing core during the period preceding the instance in time based on the timer;
  receive from each of the other of the two or more processing cores an amount of energy consumed by each of the other of the two or more processing cores during the period preceding the instance in time; and
  calculate the amount of energy consumed by the microprocessor during the period preceding the instance in time as a sum of the amount of energy consumed by all the two or more processing cores during the period preceding the instance in time.

7. The microprocessor of claim 6, wherein the timer is driven by a free running oscillator such that the timer increments even when the clocks are disabled.

8. The microprocessor of claim 6, wherein each processing core includes a second timer that keeps time while the processing core clocks are enabled, wherein the processing core is configured to calculate the amount of energy consumed by the processing core during the period preceding the instance in time based on the first and second timers.

9. The microprocessor of claim 8, wherein the processing core operating frequency is a variable ratio of a clock signal received from a bus external to the microprocessor, wherein the second timer is driven by the bus clock signal such that it increments at a constant rate regardless of the processing core operating frequency.

10. The microprocessor of claim 8, wherein each processing core is configured to calibrate the first timer in response to a reset of the processing core by counting a number of ticks of the first timer that occur during a predetermined number of ticks of the second timer.

11. The microprocessor of claim 1, wherein each of the two or more processing cores is configured to provide an amount of energy consumed by the processing core during the period preceding the instance in time to each of the other processing cores via a memory shared by the two or more processing cores.

12. The microprocessor of claim 11, wherein each of the two or more processing cores is configured to provide the amount of energy consumed by the processing core during the period preceding the instance in time to each of the other processing cores to a location in the shared memory, wherein each processing core is configured to receive the address of the location in the shared memory in response to system software writing the address into the processing core.

13. The microprocessor of claim 11, wherein each of the two or more processing cores is configured to provide the amount of energy consumed by the processing core during the period preceding the instance in time to each of the other processing cores to a location in the shared memory, wherein the address of the location in the memory resides in a system management mode (SMM) region of the memory.

14. The microprocessor of claim 1, wherein each processing core is configured to determine the amount of energy consumed by the microprocessor during the period preceding the instance in time based on an indication of an instantaneous amount of power being supplied to the microprocessor by an external power source.

15. The microprocessor of claim 1, wherein each of the succeeding instances in time comprises an instance in time in which an event occurs from the list comprising:
  indication from a timer that a predetermined time period has elapsed, a request to put the processing core to sleep, the processing core waking up from a sleeping state, and a request to update the operating frequency of the processing core.

16. The microprocessor of claim 1, wherein each processing core is configured such that system software may write into the processing core one or more predetermined value from the list comprising: the predetermined length of time, the predetermined frequency, and the predetermined amount of energy.

17. The microprocessor of claim 1, wherein each processing core comprises:
  a private random access memory (PRAM) that is inaccessible to user instructions and is only accessible to microcode of the processing core, wherein the microcode is configured to store in the PRAM an array of bins that store an amount of energy consumed by the microprocessor during succeeding subsets of the preceding period.

18. A method for operating a microprocessor, the method comprising:
  by each of two or more processing cores:
    determining, at each of succeeding instances in time, an amount of energy consumed by the microprocessor during a period preceding the instance in time, wherein the period is a predetermined length of time; and
    operating the processing core at a frequency above a predetermined frequency in response to determining that the amount of energy consumed by the microprocessor during the period preceding the instance in time is less than a predetermined amount of energy;
  wherein thereafter all of the two or more processing cores operate above the predetermined frequency simultaneously until one of the two or more processing cores determines that the microprocessor has consumed more than the predetermined amount of energy during the period preceding the instance in time.

19. The method of claim 18, wherein the predetermined frequency is a frequency at which all of the two or more processing cores of the microprocessor can operate over the predetermined length of time without the microprocessor consuming more than the predetermined amount of energy.

20. The method of claim 18, wherein the predetermined frequency is the maximum frequency at which system software may request the two or more processing cores to operate.

21. The method of claim 18, wherein said operating the processing core at the frequency above the predetermined frequency in response to determining that the amount of energy consumed by the microprocessor during the period preceding the instance in time is less than the predetermined amount of energy is performed by microcode of the processing core.

22. The method of claim 21, wherein said determining the amount of energy consumed by the microprocessor during the period preceding the instance in time is also performed by the microcode.

23. The method of claim 18, wherein each processing core includes a timer that keeps time while the processing core is in a sleep state in which clocks to a substantial portion of the processing core are disabled, the method further comprising:
calculating, by the processing core, the amount of energy consumed by the processing core during the period preceding the instance in time based on the timer;
receiving, by the processing core, from each of the other of the two or more processing cores an amount of energy consumed by each of the other of the two or more processing cores during the period preceding the instance in time; and
calculating, by the processing core, the amount of energy consumed by the microprocessor during the period preceding the instance in time as a sum of the amount of energy consumed by all the two or more processing cores during the period preceding the instance in time.

24. The method of claim 23, wherein the timer is driven by a free running oscillator such that the timer increments even when the clocks are disabled.

25. The method of claim 23, wherein each processing core includes a second timer that keeps time while the processing core clocks are enabled, wherein said calculating, by the processing core, the amount of energy consumed by the processing core during the period preceding the instance is performed based on the first and second timers.

26. The method of claim 25, wherein the processing core operating frequency is a variable ratio of a clock signal received from a bus external to the microprocessor, wherein the second timer is driven by the bus clock signal such that it increments at a constant rate regardless of the processing core operating frequency.

27. The method of claim 25, further comprising:
calibrating, by the processing core, the first timer in response to a reset of the processing core by counting a number of ticks of the first timer that occur during a predetermined number of ticks of the second timer.

28. The method of claim 18, further comprising:
providing, by the processing core, an amount of energy consumed by the processing core during the period preceding the instance in time to each of the other processing cores via a memory shared by the two or more processing cores.

29. The method of claim 28, wherein said providing, by the processing core, the amount of energy consumed by the processing core during the period preceding the instance in time to each of the other processing cores is performed to a location in the shared memory, the method further comprising:
receiving, by the processing core, the address of the location in the shared memory in response to system software writing the address into the processing core.

30. The method of claim 28, wherein each of the two or more processing cores is configured to provide the amount of energy consumed by the processing core during the period preceding the instance in time to each of the other processing cores to a location in the shared memory, wherein the address of the location in the memory resides in a system management mode (SMM) region of the memory.

31. The method of claim 18, wherein said determining the amount of energy consumed by the microprocessor during the period preceding the instance in time is performed based on an indication of an instantaneous amount of power being supplied to the microprocessor by an external power source.

32. The method of claim 18, wherein each of the succeeding instances in time comprises an instance in time in which an event occurs from the list comprising:
indication from a timer that a predetermined time period has elapsed, a request to put the processing core to sleep, the processing core waking up from a sleeping state, and a request to update the operating frequency of the processing core.

33. The method of claim 18, further comprising:
writing, by system software, into the processing core one or more predetermined value from the list comprising: the predetermined length of time, the predetermined frequency, and the predetermined amount of energy.

34. The method of claim 18, wherein each processing core comprises a private random access memory (PRAM) that is inaccessible to user instructions and is only accessible to microcode of the processing core, the method further comprising:
storing, by the microcode, in the PRAM an array of bins that store an amount of energy consumed by the microprocessor during succeeding subsets of the preceding period.

35. A computer program product encoded in at least one non-transitory computer readable storage medium for use with a computing device, the computer program product comprising:
computer readable program code embodied in said medium, for specifying a microprocessor, the computer readable program code comprising:
program code for specifying two or more processing cores, wherein each processing core is configured to:
determine, at each of succeeding instances in time, an amount of energy consumed by the microprocessor during a period preceding the instance in time, wherein the period is a predetermined length of time; and
operate the processing core at a frequency above a predetermined frequency in response to determining that the amount of energy consumed by the microprocessor during the period preceding the instance in time is less than a predetermined amount of energy;
wherein the microprocessor is configured such that all of the two or more processing cores may operate above the predetermined frequency simultaneously until one of the two or more processing cores determines that the microprocessor has consumed more than the predetermined amount of energy during the period preceding the instance in time.

36. The computer program product of claim 35, wherein the at least one non-transitory computer readable storage medium is selected from the set of a disk, tape, or other magnetic, optical, or electronic storage medium.

* * * * *